US009712032B2

(12) United States Patent
Aoyama et al.

(10) Patent No.: US 9,712,032 B2
(45) Date of Patent: Jul. 18, 2017

(54) LINEAR MOTOR AND LINEAR MOTOR DRIVE SYSTEM

(71) Applicant: Hitachi, Ltd., Chiyoda-ku, Tokyo (JP)

(72) Inventors: Yasuaki Aoyama, Tokyo (JP); Akiyoshi Komura, Tokyo (JP); Yoshitaka Iwaji, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 205 days.

(21) Appl. No.: 14/424,300

(22) PCT Filed: Oct. 23, 2013

(86) PCT No.: PCT/JP2013/078667
§ 371 (c)(1),
(2) Date: Feb. 26, 2015

(87) PCT Pub. No.: WO2014/065308
PCT Pub. Date: May 1, 2014

(65) Prior Publication Data
US 2015/0222167 A1 Aug. 6, 2015

(30) Foreign Application Priority Data
Oct. 24, 2012 (WO) .................. PCT/JP2012/077501

(51) Int. Cl.
H02K 41/03 (2006.01)
H02K 16/02 (2006.01)

(52) U.S. Cl.
CPC ........... *H02K 41/031* (2013.01); *H02K 16/02* (2013.01); *H02K 2213/03* (2013.01); *H02K 2213/12* (2013.01)

(58) Field of Classification Search
CPC ............... H02K 16/02; H02K 2213/03; H02K 2213/12; H02K 41/031
(Continued)

(56) References Cited

U.S. PATENT DOCUMENTS 5,010,262 A * 4/1991 Nakagawa ............... B25J 9/123
310/12.21
5,218,250 A * 6/1993 Nakagawa ............. H02K 21/22
310/12.21
(Continued)

FOREIGN PATENT DOCUMENTS

JP 7-27041 A 1/1995
JP 2005-245108 A 9/2005
(Continued)

OTHER PUBLICATIONS

International Search Report dated Jan. 14, 2014, with English translation (two (2) pages).

*Primary Examiner* — Alex W Mok
(74) *Attorney, Agent, or Firm* — Crowell & Moring LLP

(57) ABSTRACT

A linear motor is capable of miniaturization of a device, sharing of effective magnetic fluxes between the magnetic poles adjacent to each other, and decreasing a magnetic attractive force acting between a mover and an armature, and a linear motor drive system. The linear motor includes a mover, formed by lining up a plurality of pieces of permanent magnets or magnetic materials while inversing a magnetization direction thereof, and an armature. First and second magnetic pole teeth are disposed in such a way as to vertically tuck the permanent magnet or the magnetic material. A magnetic material links the first magnetic pole tooth to the second magnetic pole tooth, thereby forming a path for a magnetic flux, and windings are disposed on the first magnetic pole tooth and the second magnetic pole tooth, respectively. At least two units of the armatures are lined to be linked to each other.

16 Claims, 33 Drawing Sheets

(58) Field of Classification Search
USPC .................................................... 310/12.18
See application file for complete search history.

(56) References Cited

U.S. PATENT DOCUMENTS

| | | | | |
|---|---|---|---|---|
| 5,225,725 A | * | 7/1993 | Shiraki | ............... H02K 41/031 |
| | | | | 310/12.19 |
| 5,701,042 A | * | 12/1997 | Takei | ................. H02K 41/031 |
| | | | | 310/12.01 |
| 2002/0190582 A1 | * | 12/2002 | Denne | ................ H02K 41/031 |
| | | | | 310/14 |
| 2011/0070108 A1 | | 3/2011 | Arita et al. | |
| 2011/0241449 A1 | | 10/2011 | Aoyama et al. | |
| 2011/0248579 A1 | | 10/2011 | Aoyama | |
| 2011/0298308 A1 | | 12/2011 | Aoyama et al. | |

FOREIGN PATENT DOCUMENTS

| | | |
|---|---|---|
| JP | 2010-141978 A | 6/2010 |
| JP | 2011-223697 A | 11/2011 |
| WO | WO 2009/136574 A1 | 11/2009 |
| WO | WO 2010/103575 A1 | 9/2010 |
| WO | WO 2011/118568 A1 | 9/2011 |

* cited by examiner

LINEAR MOTOR AND LINEAR MOTOR DRIVE SYSTEM

TECHNICAL FIELD

The invention relates to a linear motor, and a linear motor drive system, and in particular, to a linear motor suited for producing thrust to cause a relative horizontal movement to occur between a permanent magnet of a mover and an armature, and a linear motor drive system.

BACKGROUND ART

In Patent Documents 1 to 3, respectively, there is disclosed a linear motor for producing thrust to cause a relative horizontal movement to occur between a permanent magnet of a mover and an armature.

In these Patent Documents 1 to 3, there is described a linear motor including an armature made up of magnetic poles and windings, and a mover having the permanent magnet, the mover being relatively movable against the armature, in the horizontal direction, wherein magnetic pole teeth with the magnetic pole disposed on both sides of the permanent magnet via an air gap such that the magnetic pole teeth oppose each other, and a magnetic material for linking the magnetic pole teeth together are provided, a plurality of pieces of the magnetic poles are provided in the traveling direction of the mover, magnetic fluxes generated by the windings disposed on the armature are identical in polarity at the plural pieces of the magnetic poles, the plural pieces of the magnetic pole teeth disposed so as to oppose each other are individually configured, and in addition, a distance between the magnetic pole teeth is variable for every magnetic pole teeth disposed so as to oppose each other.

CITATION LIST

Patent Literature

Patent Document 1: Japanese Unexamined Patent Application Publication No. 2011-223697
Patent Document 2: Japanese Unexamined Patent Application Publication No. 2010-141978
Patent Document 3: International Publication No. 2010/103575

SUMMARY OF INVENTION

Technical Problem

However, with the linear motor described in those Patent Documents 1 to 3, because the magnetic fluxes generated by the windings disposed on the armature are identical in polarity at the plural pieces of the magnetic poles, a problem has existed in that effective magnetic fluxes between adjacent magnetic poles lined up in the traveling direction of the mover cannot be shared as an interval between the magnetic poles becomes wider, and a device becomes larger in size although there is obtained an effect of reducing leakage fluxes between the plural pieces of magnetic poles lined up in the traveling direction of the mover.

The invention has been developed from a viewpoint described as above, and it is therefore an object of the invention to provide a linear motor capable of realizing not only miniaturization of a device but also sharing of effective magnetic fluxes between the magnetic poles adjacent to each other, and decreasing a magnetic attractive force acting between an armature and a mover, and a linear motor drive system.

Solution to Problem

To that end, according to one aspect of the invention, there is provided a linear motor comprising a mover formed by lining up a plurality of pieces of permanent magnets or magnetic materials side-by-side while inversing a magnetization direction thereof, and an armature, the armature including a first magnetic pole tooth, and a second magnetic pole tooth, disposed in such a way as to vertically tuck the permanent magnet or the magnetic material, a magnetic material for linking the first magnetic pole tooth to the second magnetic pole tooth, thereby forming a path for a magnetic flux, and windings disposed on the first magnetic pole tooth and the second magnetic pole tooth, respectively, at least two units of the armatures being lined up in the traveling direction of the mover, or the armature, to be linked with each other by use of the magnetic material. The linear motor produces thrust for causing the mover and the armatures to make a relative horizontal movement, incorporating at least two different flux paths for allowing a magnetic flux from each of the windings to pass therethrough.

The at least two different flux paths for allowing the magnetic flux from each of the windings to pass therethrough may include a first path where the magnetic flux from the winding reaches the first magnetic pole tooth from the magnetic material, the second magnetic pole tooth from the first magnetic pole tooth, and the magnetic material from the second magnetic pole tooth, and a second path reaching adjacent magnetic pole teeth in a direction orthogonal to the first path, and in the traveling direction of the mover or the armature, inside the respective armatures.

Further, the respective windings disposed on the first magnetic pole tooth and the second magnetic pole tooth may be reversed in winding direction from the respective windings disposed on adjacent first magnetic pole teeth and adjacent second magnetic pole teeth, in the traveling direction of the mover or the armature.

Still further, magnetic fluxes generated by the respective windings disposed on the first magnetic pole tooth, and the second magnetic pole tooth may be staggered in orientation from magnetic fluxes generated by the respective windings disposed on adjacent first magnetic pole teeth and adjacent second magnetic pole teeth, in the traveling direction of the mover or the armature.

Still further, the linear motor may include the first magnetic pole tooth and the second magnetic pole tooth, the magnetic material for linking the first magnetic pole tooth to the second magnetic pole tooth, for forming a path for a magnetic flux, and at least not less than two stages of windings disposed on the first magnetic pole tooth and the second magnetic pole tooth, respectively. The mover may be provided between the first magnetic pole tooth and the second magnetic pole tooth, in respective stages, a plurality of pieces of the movers being included.

Advantageous Effects of Invention

With the present invention, it is possible to obtain a linear motor capable of realizing not only miniaturization of a device but also sharing of effective magnetic fluxes between the magnetic poles adjacent to each other, and decreasing a magnetic attractive force acting between a mover and an armature, and a linear motor drive system.

DESCRIPTION OF EMBODIMENTS

Figure 1:
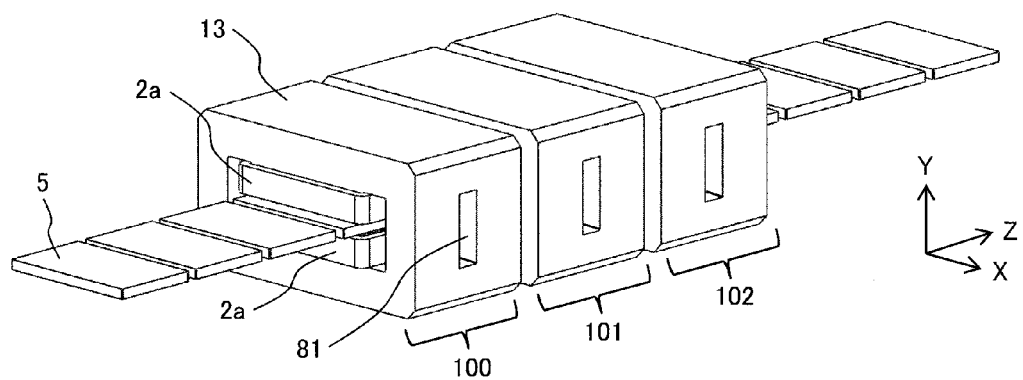
FIG. 1 is a perspective view showing a first embodiment of a linear motor according to the invention.
Figure 2:
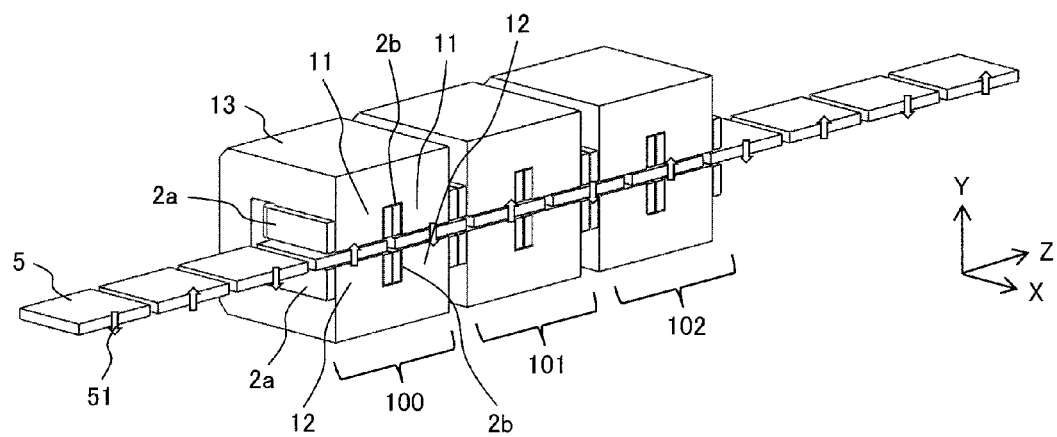
FIG. 2 is a perspective view showing the linear motor according to the first embodiment, as cut along the Y-Z plane in FIG. 1.
Figure 3:
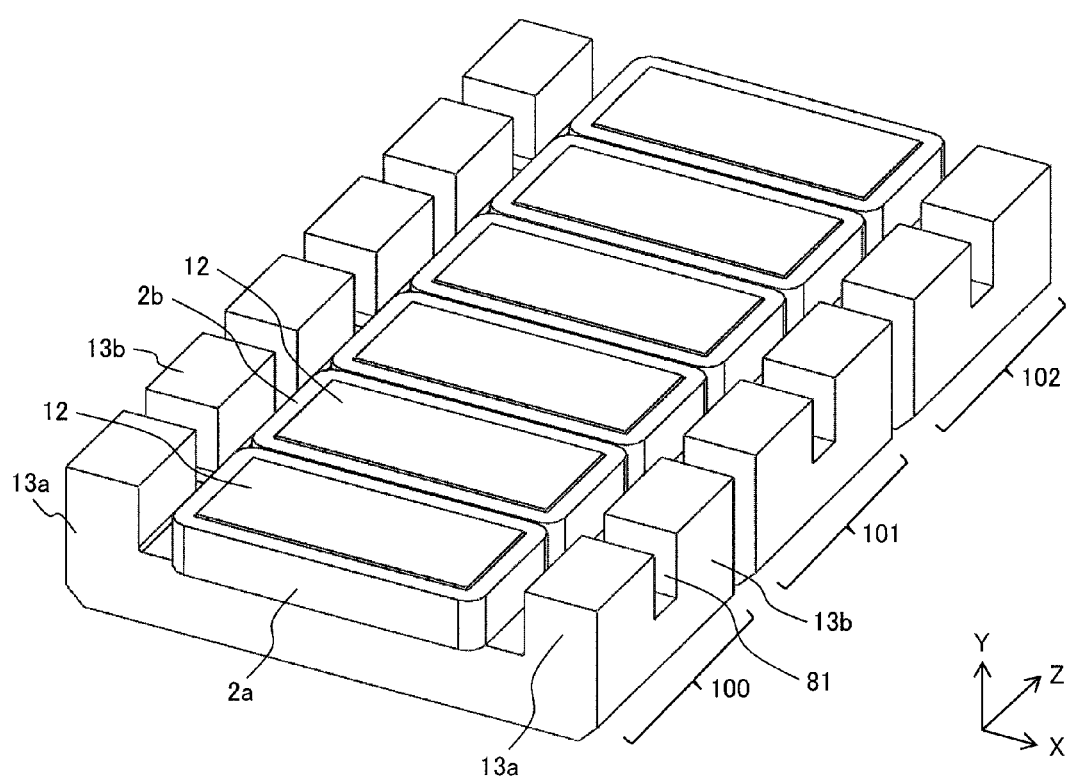
FIG. 3 is a perspective view showing the linear motor according to the first embodiment, as cut along the X-Z plane in FIG. 1 after removal of permanent magnets shown in FIG. 1.

A linear motor according to the invention is described hereinafter on the basis of respective embodiments shown in the drawings. In the respective embodiments, identical components are denoted by like signs, respectively.

First Embodiment

A first embodiment of a linear motor according to the invention is shown in FIGS. 1 through 11. The present embodiment, shown in those figures, indicates an example where a three-phase motor is configured, representing a linear motor in which a stator made up of three armatures 100, 101, 102 undergoes a relative linear movement (horizontal movement) against a mover provided with a plurality of pieces of permanent magnets 5 disposed such that the permanent magnets 5 adjacent to each other alternate in respect of magnetization direction 51. A three-phase linear motor can be configured by laying out the stator made up of the three armatures 100, 101, 102 such that each phase is electrically shifted by 120°. Similarly, an m-phase drive linear motor can be configured by use of m-pieces of the armatures.

The permanent magnets 5 are fixed to a member (not shown) for holding the permanent magnets 5, and a mover is made up of the permanent magnets 5, and the member for holding the permanent magnets 5. The mover and the stator are held by a support means capable of making a linear movement, relatively. Further, it is also possible to keep the mover fixed, and to move the stator (an armature) side.

The armature 100 is made up of a first magnetic pole tooth 11 opposed to the permanent magnet 5, on an upper-side thereof, a second magnetic pole tooth 12 opposed to the permanent magnet 5, on a lower-side thereof, and a magnetic material 13 for linking the first magnetic pole tooth 11 on the upper side to the second magnetic pole tooth 12 on the lower-side, and two units of the armatures 100 are arranged side-by-side in the travelling direction (the z-direction) of the permanent 5. Winding 2a, and winding 2b, in each of the two units of the armatures 100, are disposed on the first magnetic pole tooth 11 and the second magnetic pole tooth 12, respectively. The first magnetic pole tooth 11 and the second magnetic pole tooth 12 are each disposed at a position opposite to the permanent 5. The armatures 101, 102 each are identical in configuration to the armature 100.

Figure 4:
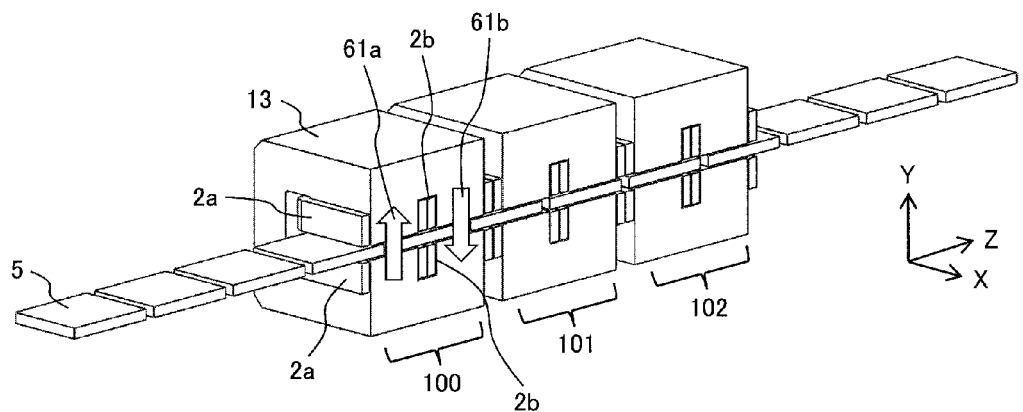
FIG. 4 is a view showing respective orientations of magnetic fluxes generated in a gap between the first magnetic pole tooth and the second magnetic pole tooth by the action of the respective windings according to the first embodiment, FIG. 4 being a view corresponding to FIG. 2.

FIG. 4 shows respective orientations of magnetic fluxes generated by the winding 2a, and the winding 2b, respectively, in a gap between the first magnetic pole tooth 11 and the second magnetic pole tooth 12 (in general, the windings of a linear motor causes a change in orientation as well as magnitude of a current over time depending on the position of a permanent magnet). FIG. 4 shows the magnetic fluxes generated in the gap, by electric currents flowing through the winding 2a, and the winding 2b, respectively, at a time.

As shown in FIG. 4, the winding 2a generates a magnetic flux 61a upward from the lower side, and the winding 2b generates a magnetic flux 61b downward from the upper side.

Figure 5:
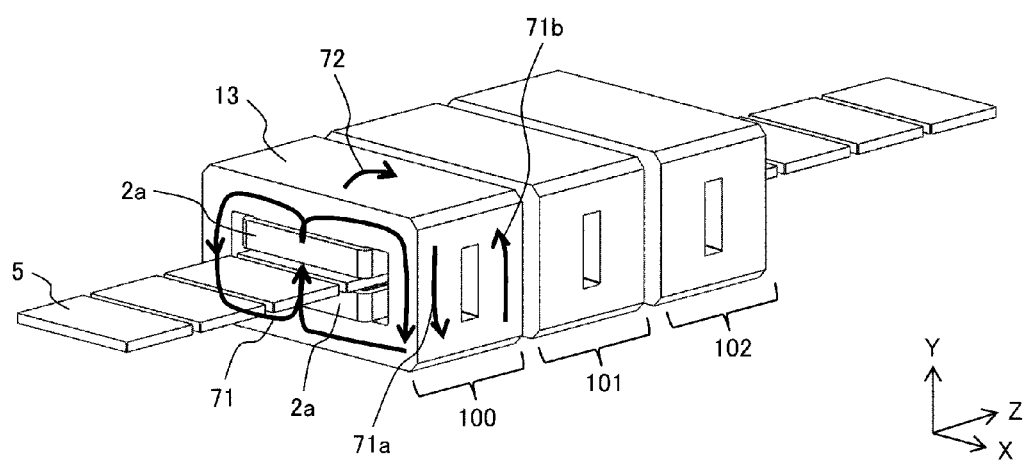
FIG. 5 is a view corresponding to FIG. 1, showing a first magnetic flux path, and a second magnetic flux path, in the linear motor according to the first embodiment.
Figure 6:
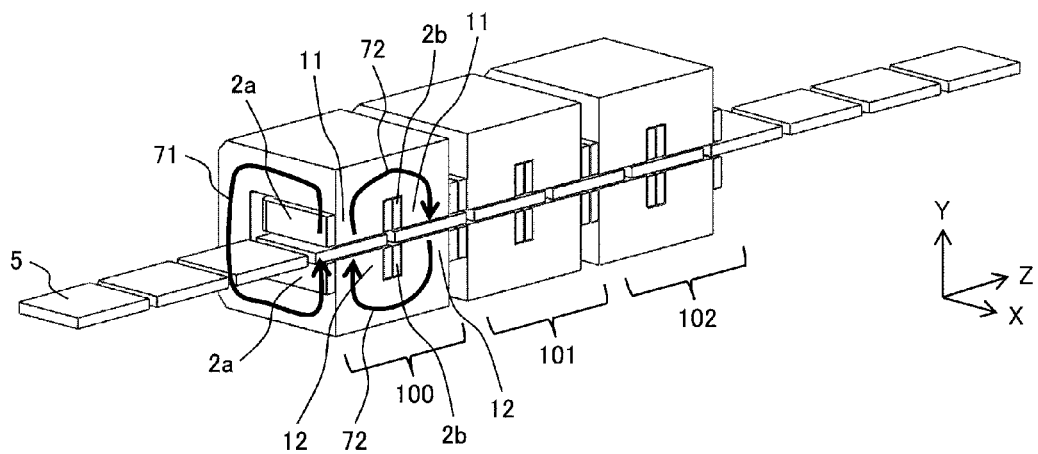
FIG. 6 is a view corresponding to FIG. 2, showing the first magnetic flux path, and the second magnetic flux path, in the linear motor according to the first embodiment.
Figure 7:
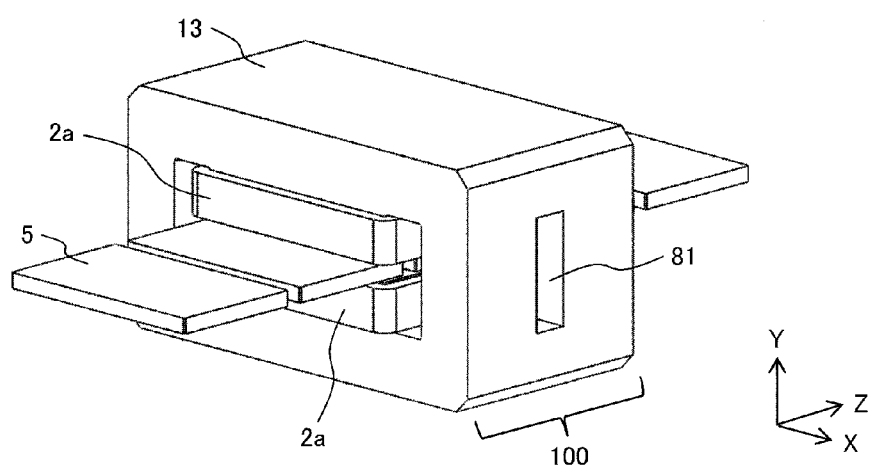
FIG. 7 is a perspective view showing an armature corresponding to one phase in the linear motor shown in FIG. 5.

With the present embodiment, there are formed two different flux paths, through which magnetic fluxes 71, 72, generated by the windings 2a, 2b, respectively, pass, as shown in FIGS. 5, 6, respectively.

Figure 10:
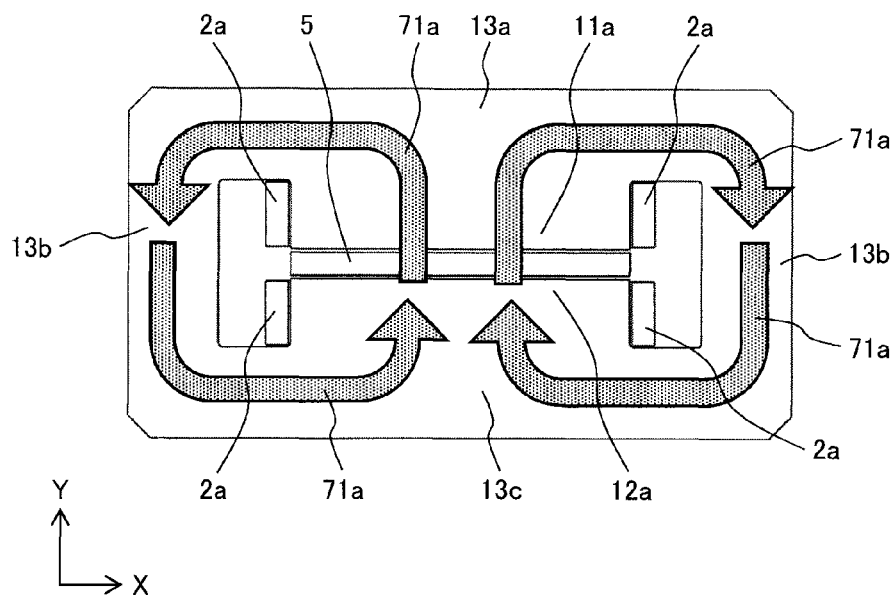
FIG. 10 is a view showing the armature in FIG. 8, as seen from a direction indicted by the arrow A.
Figure 11:
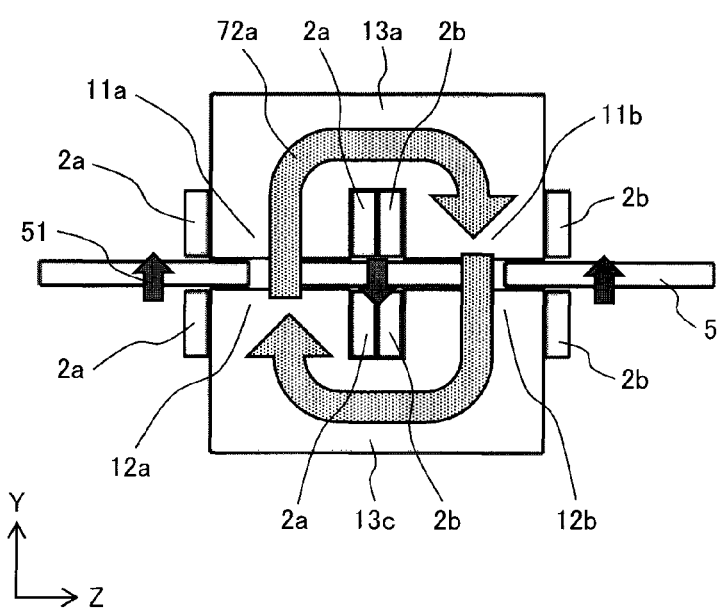
FIG. 11 is a view showing the armature, shown in FIG. 9, as seen from a direction indicted by the arrow B.

The above is described in detail hereinafter with reference to FIGS. 7 to 11. As shown in these figures, one of the two different flux paths, through which the magnetic fluxes 71, 72 generated by the windings 2a, 2b, pass, respectively, is a first path where a magnetic flux 71a generated by the winding 2a reaches a second magnetic pole tooth 12a via a first magnetic pole tooth 11a, a magnetic material 13a, a magnetic material 13b, and a magnetic material 13c, as shown in FIG. 10. The other path is a second path where a magnetic flux 72a generated by the winding 2a and the winding 2b reaches the second magnetic pole tooth 12a via the first magnetic pole tooth 11a, the magnetic material 13a, a second magnetic pole tooth 11b, a second magnetic pole tooth 12b, and the magnetic material 13c, as shown in FIG. 11.

That is, the one of the two different flux paths is the first path where the magnetic flux 71 from the windings 2a, 2b reaches the first magnetic pole tooth 11 from the magnetic material 13, the second magnetic pole tooth 12 from the first magnetic pole tooth 11, and the magnetic material 13 from the second magnetic pole tooth 12. The other magnetic flux path is the second path where the magnetic flux 72 from the windings 2a, 2b reaches adjacent magnetic pole teeth in a direction orthogonal to the first path (the traveling direction of the permanent magnet 5 (the z-direction)), and in the traveling direction of the mover.

To describe in more detail the second path through which the magnetic flux 72 passes, the second path serves as a circulation path where the magnetic flux 72 from the windings 2a, 2b flows between the respective first magnetic pole teeth 11 on the upper-side of the armatures adjacent to each other, in the traveling direction of the mover, via the magnetic material 13, the magnetic flux 72 continuing to flow between the respective second magnetic pole teeth 12 on the lower side of the armatures, via the magnetic material 13, as shown in FIG. 6.

With the adoption of such a configuration as described above, the magnetic fluxes from the windings 2a, 2b end up passing through the first and second paths, thereby leading to an increase in sectional area of the magnetic flux paths, thereby enabling thrust to be efficiently increased.

Accordingly, a small size linear motor can be provided, and further, a magnetic flux 71a having a path leading to the first magnetic pole tooth 11 from the magnetic material 13, to the second magnetic pole tooth 12 from the first magnetic pole tooth 11, and to the magnetic material 13 from the second magnetic pole tooth 12 is flowing in the reverse direction of a magnetic flux 71b having a path leading to the first magnetic pole tooth 11 from the magnetic material 13 of the armatures adjacent to each other, in the traveling direction (the z-direction) of the permanent magnet 5, to the second magnetic pole tooth 12 from the first magnetic pole tooth 11, and to the magnetic material 13 from the second magnetic pole tooth 12, as shown in FIG. 5, so that there is obtained an effect of relieving magnetic saturation. By so doing, miniaturization of a linear motor, and reduction in iron loss can be attained.

Because the magnetic flux generated by the winding 2a, and the magnetic flux generated by the winding 2b are staggered in respect of magnetic flux orientation, magnetic flux orientation in the magnetic material 13a for linking the first magnetic pole tooth 11 to the second magnetic pole tooth 12 is in the reverse direction of that in the magnetic material 13b for linking the adjacent first magnetic pole tooth 11 to the adjacent second magnetic pole tooth 12 (as in the case of the magnetic fluxes 61a and 61b, shown in FIG. 4), so that a magnetic flux density is reduced, and the effects of relieving magnetic saturation is obtained. Owing to these effects, it is possible to reduce a sectional area of each of the magnetic bodies 13a, 13b for use in linking the first magnetic pole tooth 11 to the second magnetic pole tooth 12, respectively, leading to miniaturization of a linear motor.

Further, with the present embodiment, an empty space 81 (refer to FIGS. 1, 3) is formed in a part between a lateral face of the magnetic material 13a for linking the first magnetic pole tooth 11 to the second magnetic pole tooth 12 and a lateral face of the magnetic material 13b for linking the adjacent first magnetic pole teeth 11 to the adjacent second magnetic pole teeth 12, in the traveling direction of the mover, so that cooling performance of the winding can be enhanced by sending a cooling wind into the empty space 81. Further, an additional effect of achieving enhancement in easiness in drawing out the windings 2a, 2b by use of the empty space 81, and so forth can be expected. Furthermore, the empty space 81 can be utilized as space for use in installation of a member for mechanical holding of the mover.

Further, with the linear motor according to the present embodiment, since the armatures in respective phases are independent from each other, three-phase armatures are insusceptible to imbalance, so that it is possible to realize reduction in thrust ripple, and low detent force.

With the present embodiment described as above, needless to say, not only miniaturization of a device can be realized but also effective magnetic fluxes between the magnetic poles adjacent to each other can be shared, and since the first magnetic pole tooth 11 is opposed to the second magnetic pole tooth 12, attractive forces between the permanent magnet 5 and the respective magnetic pole teeth cancel each other out, so that there is obtained an advantageous effect in that a magnetic attractive force acting between the mover and the armature is decreased.

Second Embodiment

Figure 12:
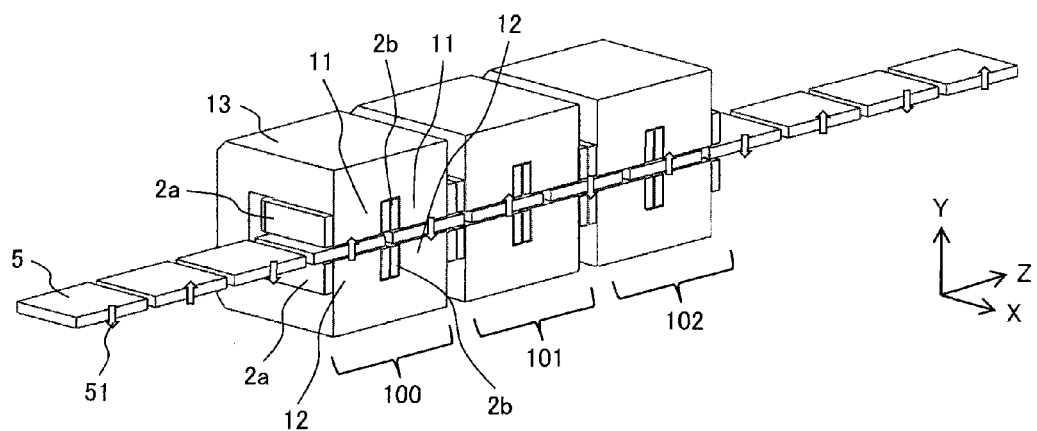
FIG. 12 is a perspective view showing a second embodiment of the linear motor according to the invention.

A second embodiment of the linear motor according to the invention is shown in FIGS. 12 to 19. The linear motor according to the present embodiment, shown in FIG. 12, is substantially identical in configuration to the first embodiment, omitting therefore description in detail.

In order to realize a large thrust, and high-speed driving by use of a linear motor, it is generally necessary for a large current to flow through the winding of the linear motor. However, as a current flowing through the winding increases, the diameter of the winding, as well, has a tendency to increase. For example, with a three-phase motor, use is made of respective windings in u-phase, v-phase, and w-phase, and in the case where a plurality of windings in one phase are provided, such as the case where an interval between the windings in the same phase is far off, the windings in the respective phases intersect each other, and so forth, there occurs an increase in space occupied by a connecting wire for use in connecting the plural windings with each other, so that there has arisen a problem of an increase in the physical size of a linear motor and an increase in inductance. With the linear motor requiring a large thrust, and high-speed driving, in particular, such effects as described will noticeably show up.

Figure 13:
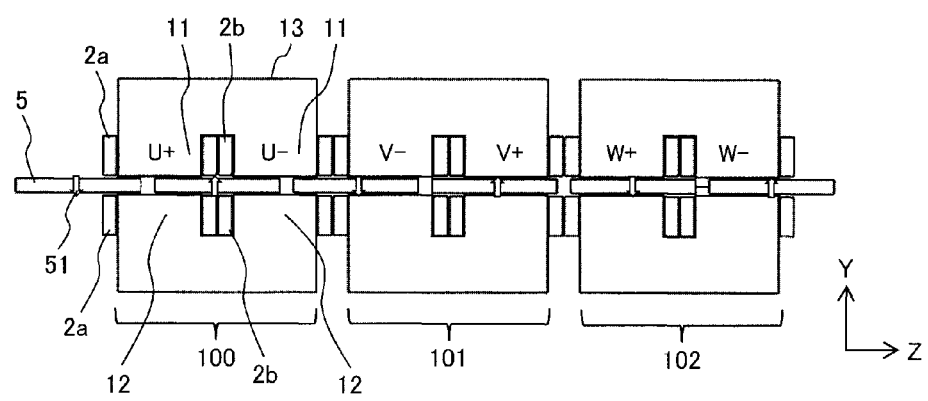
FIG. 13 is a view for describing respective phases of windings wound around each of three-phase armatures in the second embodiment of the linear motor according to the invention.

Accordingly, with the present embodiment, respective current-phases of the windings 2a, 2b, wound around each of the armatures 100, 101, 102, are as shown in FIG. 13, and the windings 2a, 2b are disposed such that each phase is tuned into a reverse phase (a phase electrically having a 180° phase difference) for every adjacent first magnetic pole teeth 11, in the z-direction, and every adjacent second magnetic pole teeth 12, in the z-direction.

If the winding directions of the windings 2a, 2b of the adjacent first magnetic pole teeth 11, and the adjacent second magnetic pole teeth 12, respectively, are varied from each other, or wires at respective outlets/inlets of the windings 2a, 2b are interchanged, such a layout as described above can be achieved.

As shown in FIG. 13, if the respective phases of the windings 2a, 2b are varied by 180°, in the adjacent first magnetic pole teeth 11, and the adjacent second magnetic pole teeth 12, respectively, this will render it possible to make connection between the windings 2a, 2b, adjacent to each other, so that a space for the connecting wire can be cut back. Further, since a connecting wire intersecting between the windings in the respective phases does not exist, a small size linear motor can be configured.

With the present embodiment, because respective winding directions are opposed to each other in the adjacent first magnetic pole teeth 11 and the adjacent second magnetic pole teeth 12, respectively, the same magnetic fluxes as those of the first embodiment shown in FIG. 4 are generated, thereby exhibiting an effect of suppressing the magnetic saturation. Further, respective magnetic circuits of the adjacent second magnetic pole teeth 12 as well as the adjacent first magnetic pole teeth 11 are disposed in a mirror-image layout, so that another advantage of higher permeance is gained. Furthermore, the magnetic flux 71a is reversed in orientation from magnetic flux 71b, as previously shown in FIG. 5, so that the magnetic saturation can be relieved. By so doing, the present embodiment has the advantage of attaining enhancement in thrust, and reducing ripple due to the magnetic saturation.

Thus, by applying windings having an identical phase and reverse phase, respectively, to the adjacent magnetic pole teeth, the performance of the linear motor can be enhanced.

For example, if the windings are disposed such that phases thereof are arranged in the order of U phase, −U phase, −V phase, V phase, W phase, and −W phase (with reference to U phase, V phase, and W phase, in FIG. 13, it is indicated that an electrical phase difference between U phase, and V phase is 120°, an electrical phase difference between V phase, and W phase is 120°, and an electrical phase difference between U phase and −U phase is 180°), this will render it to possible to arrange six pieces of the magnetic pole teeth in the z-direction against five pieces of the permanent magnets 5, as shown in FIG. 13, thereby enabling the respective armatures 100, 101, 102 to be lined up.

Figure 14:
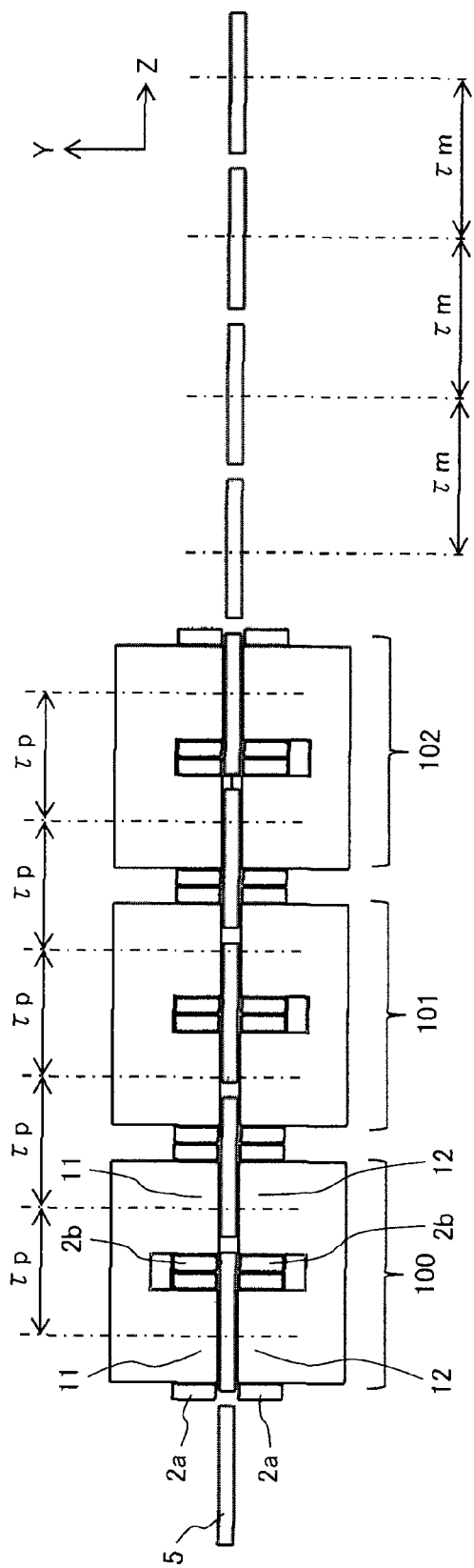
FIG. 14 is a view showing a configuration where six pieces of the magnetic pole teeth in the z-direction are arranged against five pieces of the permanent magnets, in the second embodiment of the linear motor according to the invention.

Further, in FIG. 14, there is shown a relationship between a magnet pitch τm and a pitch τp between the adjacent magnetic pole teeth, in the z-direction.

A configuration where the six pieces of the magnetic pole teeth in the z-direction are arranged against the five pieces of the permanent magnets 5 (a relationship of 5 τm=6 τp), as shown in FIG. 14, indicates just one example, and if the same effect is obtained by disposing the windings 2a, 2b of the adjacent magnetic pole teeth so as to have an identical phase, the invention is not limited to this configuration.

Figure 15:
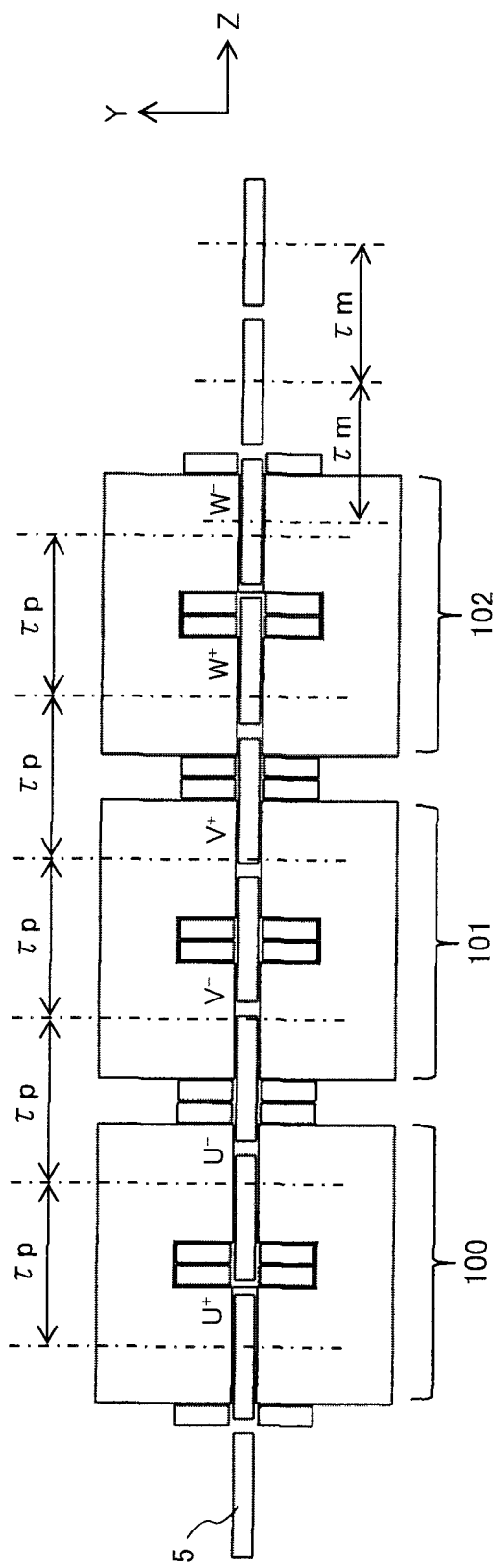
FIG. 15 is a view showing a configuration where six pieces of the magnetic pole teeth in the z-direction are arranged against seven pieces of the permanent magnets, in the second embodiment of the linear motor according to the invention.

For example, if seven pieces of the permanent magnets 5, and six pieces of the magnetic pole teeth, in the z-direction, are arranged (7 τm=6 τp), as shown in FIG. 15, a plurality of windings for the adjacent magnetic pole teeth can be disposed such that windings having an identical phase (+U phase, and −U phase differing in phase from +U phase by 180°), respectively, are arranged side-by-side. By so doing, magnetic saturation of a flux path can be resolved.

Figure 16:
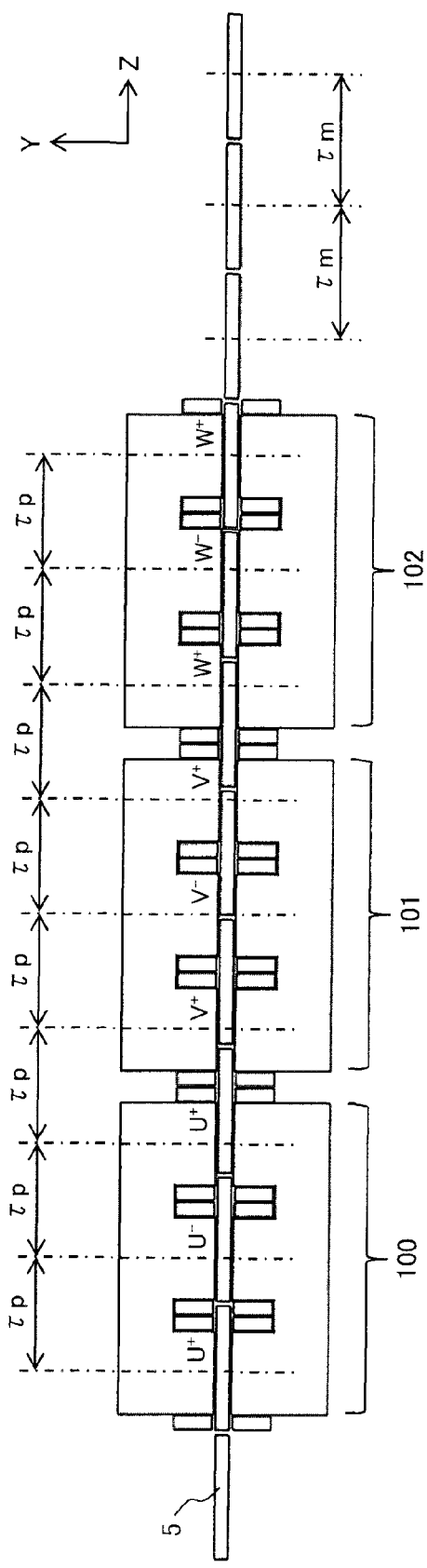
FIG. 16 is a view showing a configuration where nine pieces of the magnetic pole teeth in the z-direction are arranged against eight pieces of the permanent magnets, in the second embodiment of the linear motor according to the invention.
Figure 17:
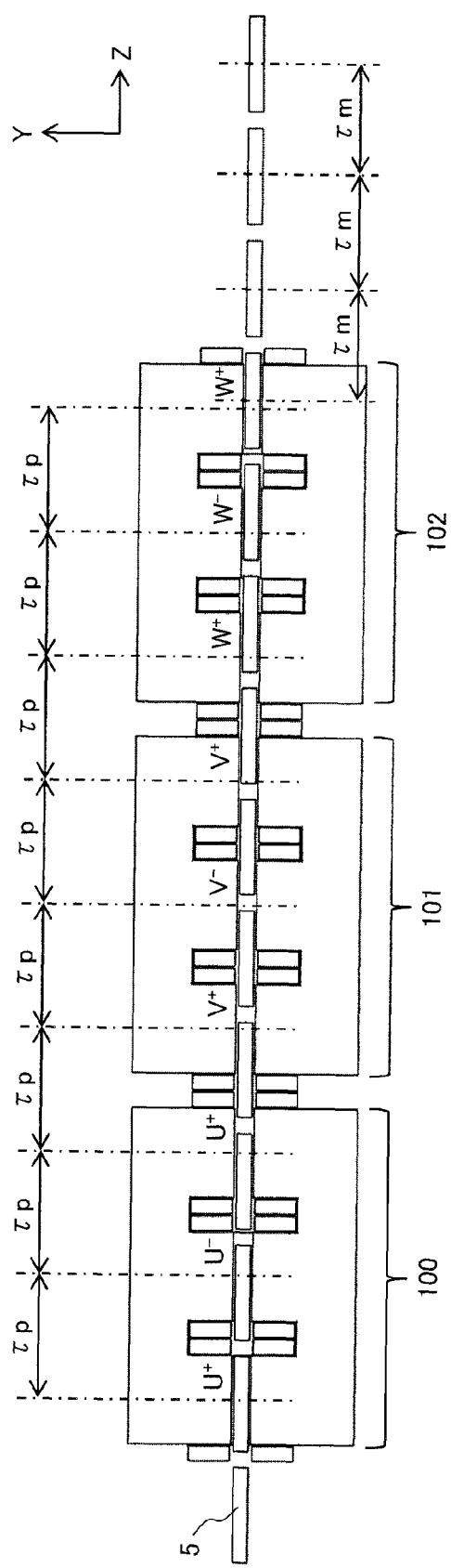
FIG. 17 is a view showing a configuration where nine pieces of the magnetic pole teeth in the z-direction are arranged against ten pieces of the permanent magnets, in the second embodiment of the linear motor according to the invention.

Further, in FIG. 16, there is shown a configuration example in the case where eight pieces of the permanent magnets 5, and nine pieces of the magnetic pole teeth in the z-direction are arranged (8 τm=9 τp). Still further, in FIG. 17, there is shown a configuration example in the case where ten pieces of the permanent magnets 5, and nine pieces of the magnetic pole teeth in the z-direction are arranged (10 τm=9 τp). In both of FIGS. 16, 17, the plural windings for the adjacent magnetic pole teeth can be disposed by arranging the windings having an identical phase side-by-side. By so doing, the magnetic saturation of the flux path can be resolved.

More specifically, in the case of the three-phase linear motor, if the number of the magnetic pole teeth arranged in the z-direction is 3 m (m=an integer, 2, 3, 4 . . . ), 3m±1 pieces of the permanent magnets be disposed.

The linear motor according to the invention has an effect of relieving magnetic saturation by taking advantage of the magnetic flux in the reverse direction, and therefore, "m" is an integer 2 or more. Accordingly, it need only be sufficient if the relationship between the magnet pitch an and the pitch τp between the magnetic pole teeth, in the z-direction, is (3m±1) τm=3m τp.

Figure 18:
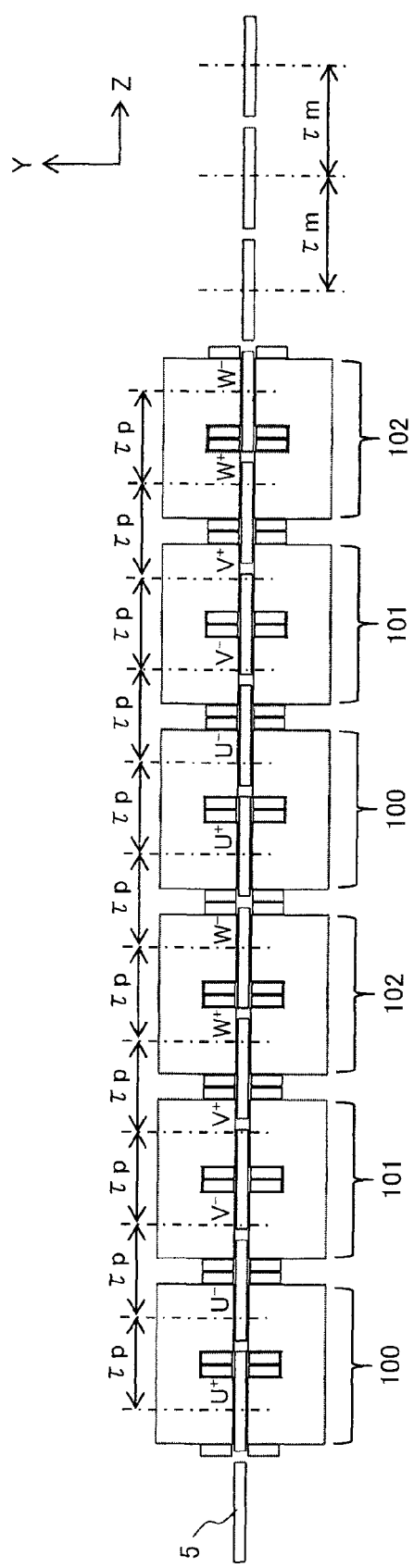
FIG. 18 is a view showing a configuration whereby two units of the configuration shown in FIG. 14 are arranged in the z-direction, and twelve pieces of the magnetic pole teeth in the z-direction are arranged against ten pieces of the permanent magnets, in the second embodiment of the linear motor according to the invention.

Further, there can be adopted a configuration where two groups of the armatures 100, 101, 102, each group having the relationship of 5 τm=6 τp, are lined up in the z-direction to thereby vary the relationship to 10 τm=12 τp, as shown in FIG. 18. That is, it need only be sufficient if the relationship between the magnet pitch τm and the pitch τp between the magnetic pole teeth, in the z-direction, is varied to n (3m±1) τm=3mnτp (n=an integer, 1, 2, 3, 4 . . . ).

Figure 19:
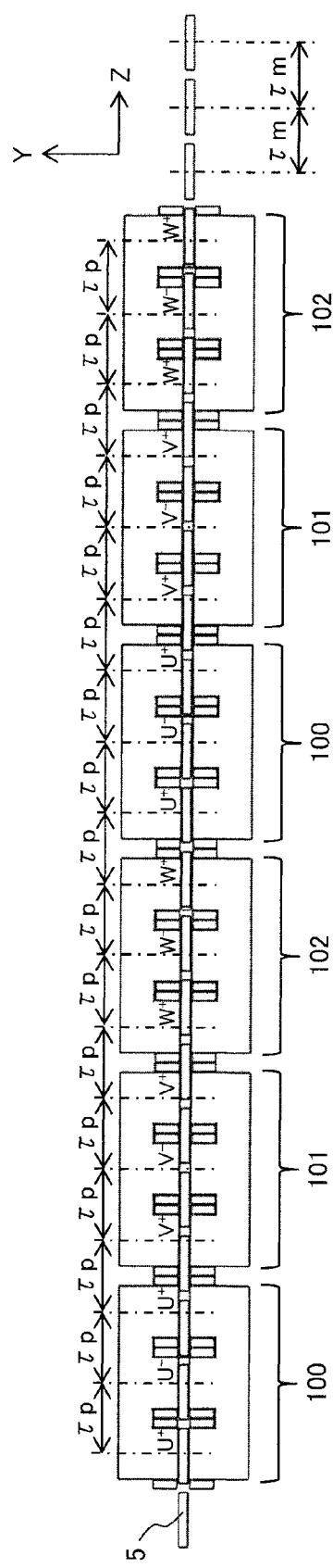
FIG. 19 is a view showing a configuration whereby two units of the configuration shown in FIG. 17 are arranged in the z-direction, and eighteen pieces of the magnetic pole teeth in the z-direction are arranged against twenty pieces of the permanent magnets, in the second embodiment of the linear motor according to the invention.

Further, FIG. 19 shows an embodiment of the invention where n=2, and m=3, indicating an example in which 2×(3×3+1) τm=3×3×2 τp, that is, 20 τm=18 τp.

Thus, with the present embodiment, needless to say, the same effect as in the case of the first embodiment is obtained. Further, in the case of the linear motor according to the present embodiment, the armatures in the respective phases are independent, and magnetic flux interference between the adjacent armatures is small. There occurs a difference in thrust characteristic between the case of a phase at one end of the armature (on one side of the armature in a phase, in the z-direction, the armature in another phase is present, and on the other side thereof, the armature in another phase is not present) and the case of a phase at the center of the armature (the armature in another phase is present on both sides of the armature in a phase). If interference between the armatures in the respective phases is large, there occurs an increase in difference between thrust attributable to the phase at the end of the armature, and thrust attributable to the phase at the center of the armature, thereby causing an increase in thrust ripple, and detent force.

In the case of the linear motor according to the present embodiment, since the armatures in the respective phases are independent, three-phase armatures are insusceptible to imbalance, so that there is obtained the effect of realizing reduction in thrust ripple, and low detent force.

Third Embodiment

Figure 20:
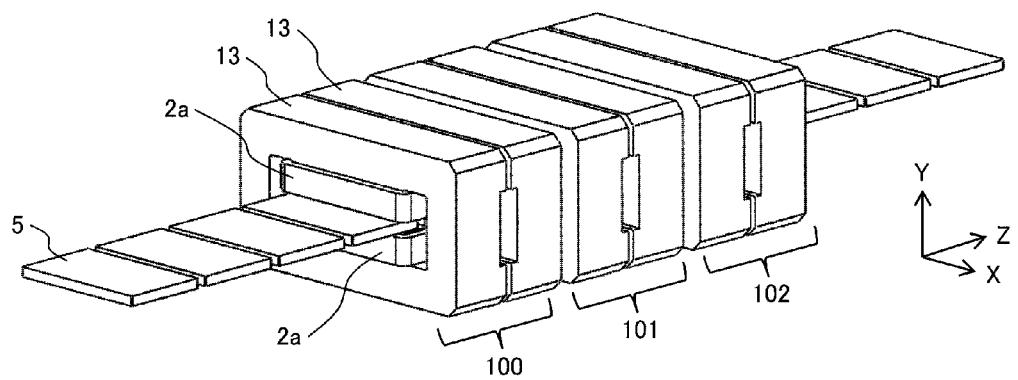
FIG. 20 is a perspective view showing a third embodiment of the linear motor according to the invention, corresponding to FIG. 1.
Figure 21:
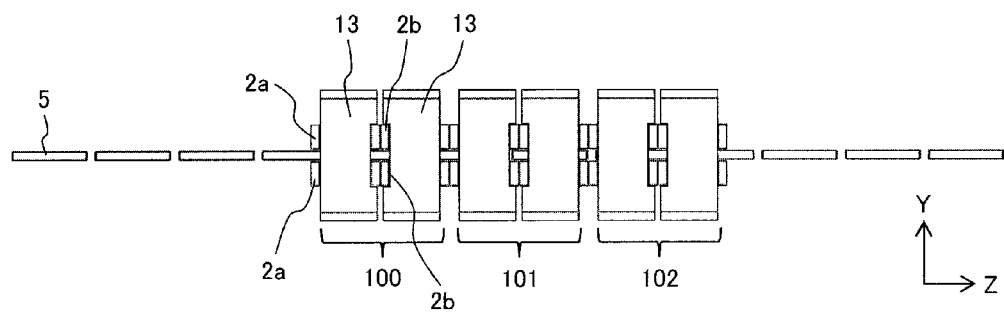
FIG. 21 is a side view of the configuration shown in FIG. 17.

A third embodiment of the linear motor according to the invention is shown in FIGS. 20, 21. The linear motor according to the present embodiment, shown in the figures, is substantially identical in configuration to the first embodiment, omitting therefore description in detail.

The present embodiment, shown in the figures, has a configuration substantially identical to the configuration of the linear motor according to the first embodiment, except that the magnetic material 13 for linking the first magnetic pole tooth 11 to the second magnetic pole tooth 12, and the magnetic material 13 for linking the adjacent first magnetic pole tooth 11 to the adjacent second magnetic pole tooth 12, in the traveling direction (the z-direction) of the mover, are divided in the z-direction.

For example, if the armature is made up of laminated steel plates, and so forth, a slight gap occurs in reality, so that the magnetic material 13 is divided by this gap along the traveling direction (the z-direction) of the mover. As the gap is expanded, so the number of the magnetic fluxes 72 of the flux path in the z-direction gradually decreases, and it is important to control the gap to an extent of preventing the flux path in the z-direction from being blocked.

Even in the case where the magnetic material 13 for linking the first magnetic pole tooth 11 to the second magnetic pole tooth 12, is divided in the traveling direction (the z-direction) of the mover, as shown in FIGS. 20, 21, there occur magnetic fluxes including the magnetic flux moving through the path leading to the first magnetic pole tooth 11 from the magnetic material 13, to the second magnetic pole tooth 12 from the first magnetic pole tooth 11, and to the magnetic material 13 from the second magnetic pole tooth 12, and the magnetic flux moving through the path in the traveling direction of the permanent magnet 5, orthogonal to the path described as above, so that the sectional area of flux paths is expanded, and therefore, magnetic reluctance is reduced.

With the present embodiment described as above, needless to say, the same effect as obtained in the first embodiment is obtained, and the same can be said even in the case where the magnetic material 13 for linking the first magnetic pole tooth 11 to the second magnetic pole tooth 12 is not continuous in the traveling direction of the permanent magnet 5. Further, cooling as well as maintenance of the winding 2a, 2b can be carried out by taking advantage of a gap between the respective magnetic bodies 13 for linking the first magnetic pole tooth 11 to the second magnetic pole tooth 12.

Fourth Embodiment

Figure 22:
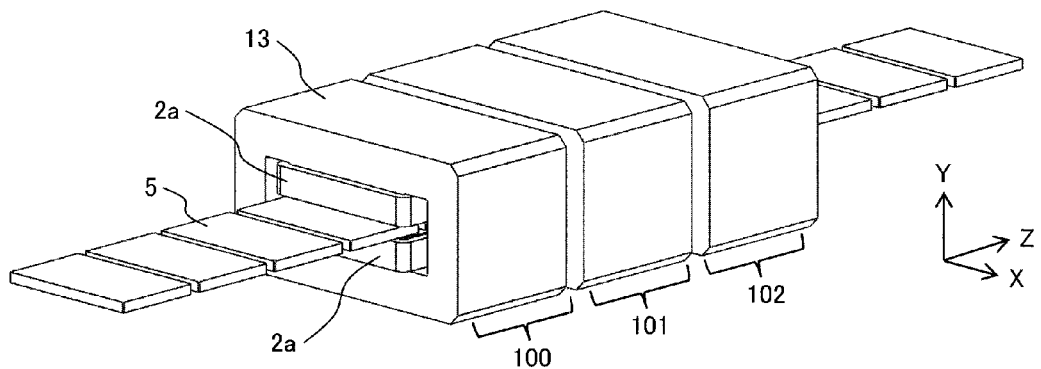
FIG. 22 is a perspective view showing a fourth embodiment of the linear motor according to the invention, corresponding to FIG. 1.
Figure 23:
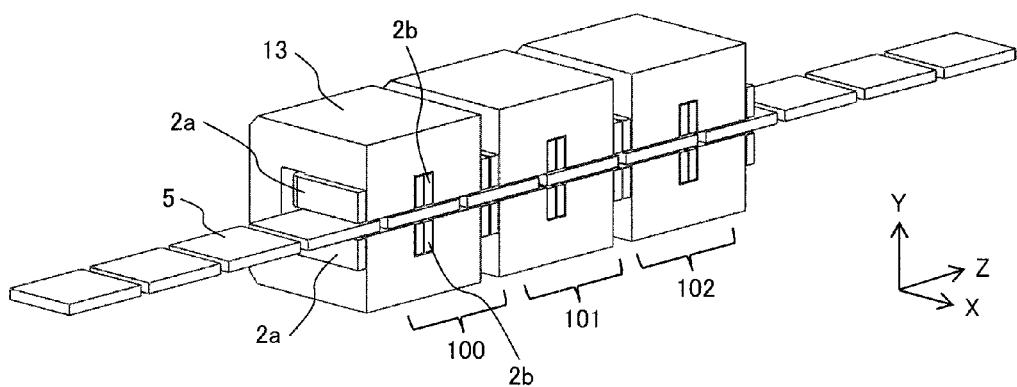
FIG. 23 is a perspective view showing the linear motor shown in FIG. 22, as cut along the Y-Z plane.

A fourth embodiment of the linear motor according to the invention is shown in FIGS. 22, 23. The linear motor according to the present embodiment, shown in the figures, is substantially identical in configuration to the first embodiment, omitting therefore description in detail.

The present embodiment, shown in the figures, has a configuration substantially identical to the configuration of the linear motor according to the first embodiment, except for a construction where a magnetic material is embedded in the empty space 81 (refer to FIGS. 1, 3) between the respective magnetic bodies 13 for linking the first magnetic pole tooth 11 to the second magnetic pole tooth 12, in the linear motor shown in FIG. 1.

More specifically, with the present embodiment, drawing-out of the windings 2a, 2b, and so forth are carried out from an empty space of each of the armatures 100, 101, 102, and the sectional area of a flux path in the magnetic material 13 for linking the first magnetic pole tooth 11 to the second magnetic pole tooth 12 is increased.

With the present embodiment described as above, needless to say, the same effect as obtained in the first embodiment is obtained, and further, the magnetic material 13 linking the first magnetic pole tooth 11 to the second magnetic pole tooth 12 is rendered smaller in size, so that a smaller-size linear motor can be configured.

Fifth Embodiment

Figure 24:
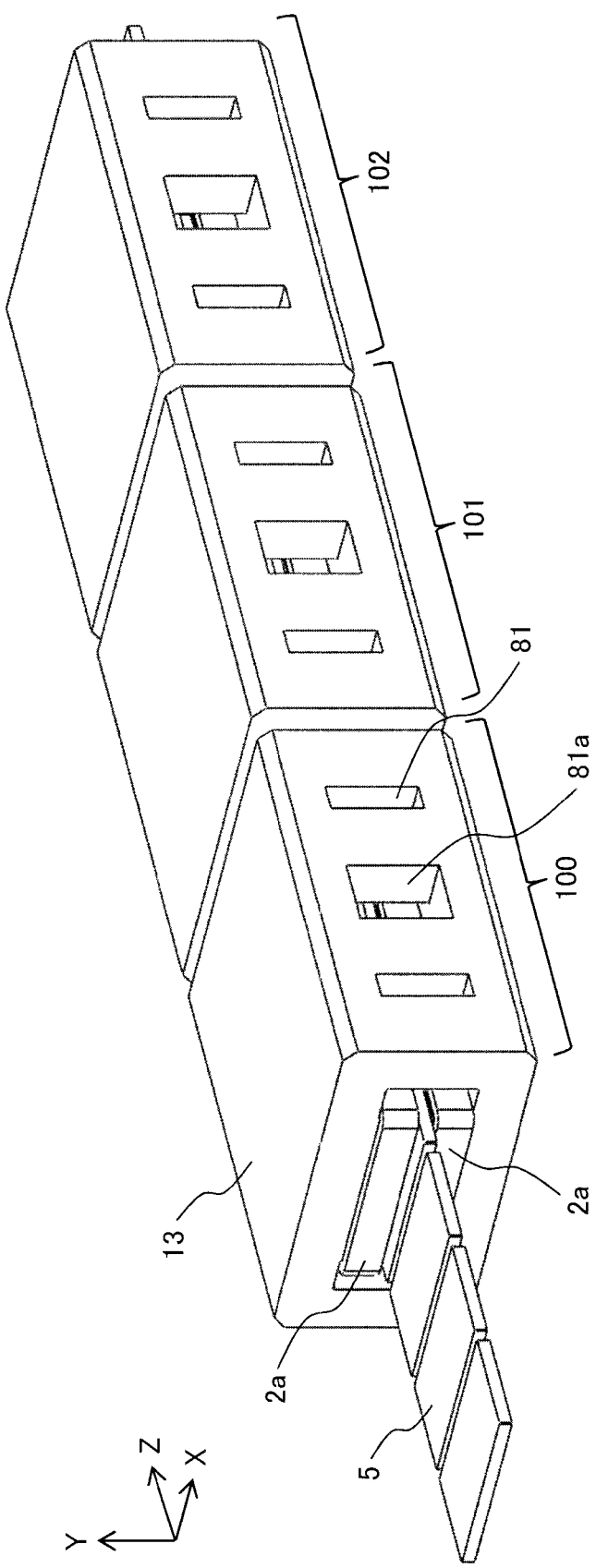
FIG. 24 is a perspective view showing a fifth embodiment of the linear motor according to the invention.
Figure 25:
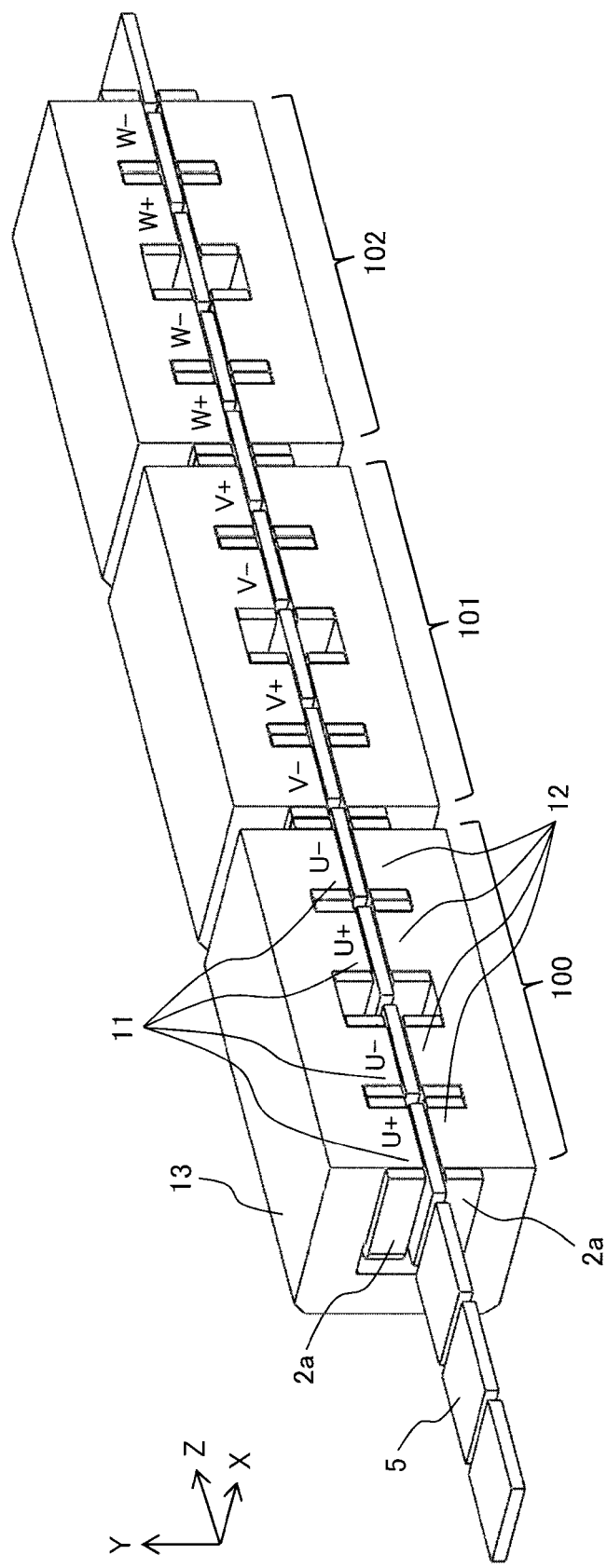
FIG. 25 is a perspective view showing the linear motor shown in FIG. 24, as cut along the Y-Z plane.

A fifth embodiment of the linear motor according to the invention is shown in FIGS. 24, 25. The linear motor according to the present embodiment, shown in the figures, is substantially identical in configuration to the first embodiment, omitting therefore description in detail.

The present embodiment, shown in the figures, has a configuration where two units of the armatures 100 of the linear motor shown in FIG. 1 are lined up in the raveling direction of the mover, to be disposed such that an interval between the two units of the armatures 100 corresponds to an electric angle 360°.

With the present embodiment described as above, needless to say, the same effect as obtained in the first embodiment is obtained, and further, it becomes possible to increase the size of an empty space 81a provided in the magnetic material 13 for linking the first magnetic pole tooth 11 to the second magnetic pole tooth 12 by laying out such that an interval between adjacent first magnetic pole teeth 11 of the armature 100 shown in FIG. 1 corresponds to an electric angle 150° while the armature 100 is disposed by shifting a phase by 360° in the raveling direction of the mover. Furthermore, three-phase armatures 100, 101, 102 can be lined up. That is, the armatures 100, 101, 102 can be arrayed without causing occurrence of a needless gap between the armatures in respective phases.

Further, with the use of the empty space 81a provided according to the configuration of the present embodiment, it becomes possible to check the respective interiors of the armatures 100, 101, 102, improve the cooling performance of the windings 2a, 2b, perform maintenance of the mover, and so forth. Since the respective interiors of the armatures 100, 101, 102 can be checked without disassembling thereof, maintainability as well is enhanced.

FIG. 25 shows a layout of winding phases by way of example. In FIG. 25, as for the winding phases of the respective armatures 100, 101, 102, a winding having an identical phase, and a winding having a 180° phase difference are disposed so as to be adjacent to each other in the same armature, so that an effect of facilitating routing of the windings is obtained.

Sixth Embodiment

Figure 26:
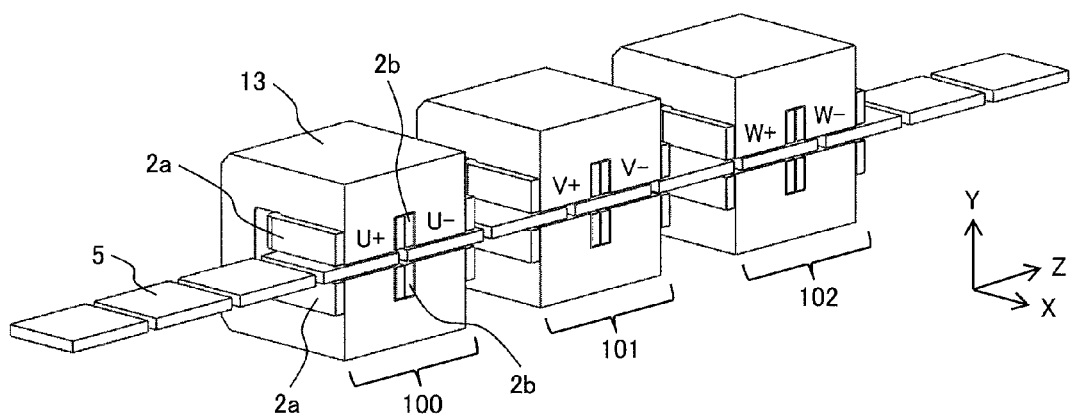
FIG. 26 is a perspective view showing a sixth embodiment of the linear motor according to the invention, as cut along the Y-Z plane.

A sixth embodiment of the linear motor according to the invention is shown in FIG. 26. The linear motor according to the present embodiment, shown in the figure, is substantially identical in configuration to the first embodiment, omitting therefore description in detail.

With the present embodiment, shown in the figure, the armatures 100, 101, 102 are disposed such that an interval between the adjacent armatures corresponds to an electric angle (360°+120°).

With the present embodiment described as above, needless to say, the same effect as obtained in the first embodiment is obtained, and since the interval between the armatures 100, 101 is the interval corresponding to the electric angle (360°+120°), it becomes possible to reduce magnetic interference between respective phases, so that there are obtained effects of reducing thrust ripple, and inductance interference between phases. Further, controllability as well is enhanced due to the effect of the inductance interference. Furthermore, there is obtained an additional effect of utilizing an empty space between the respective armatures for the purposes of maintenance of the winding, and the mover, or cooling of the winding, and so forth.

Seventh Embodiment

Figure 27:
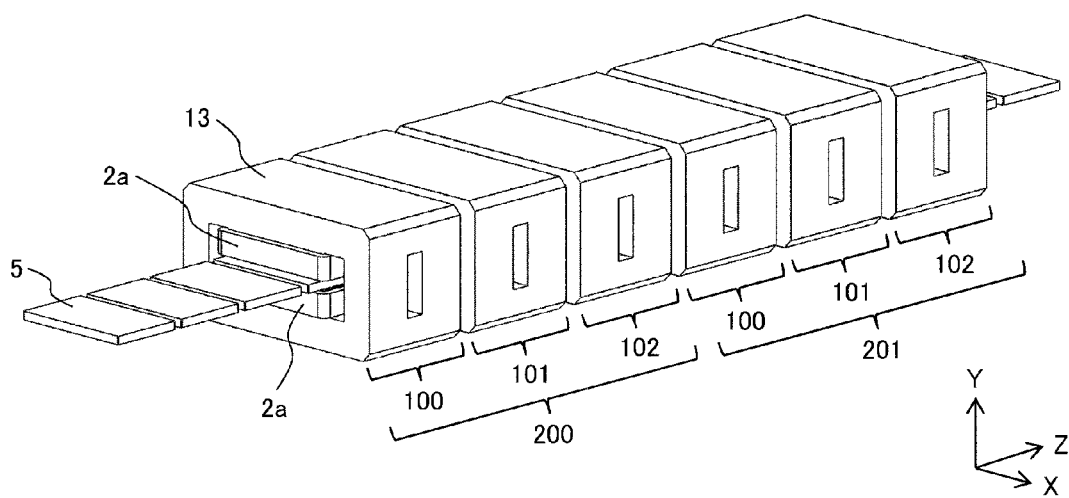
FIG. 27 is a perspective view showing a seventh embodiment of the linear motor according to the invention.
Figure 28:
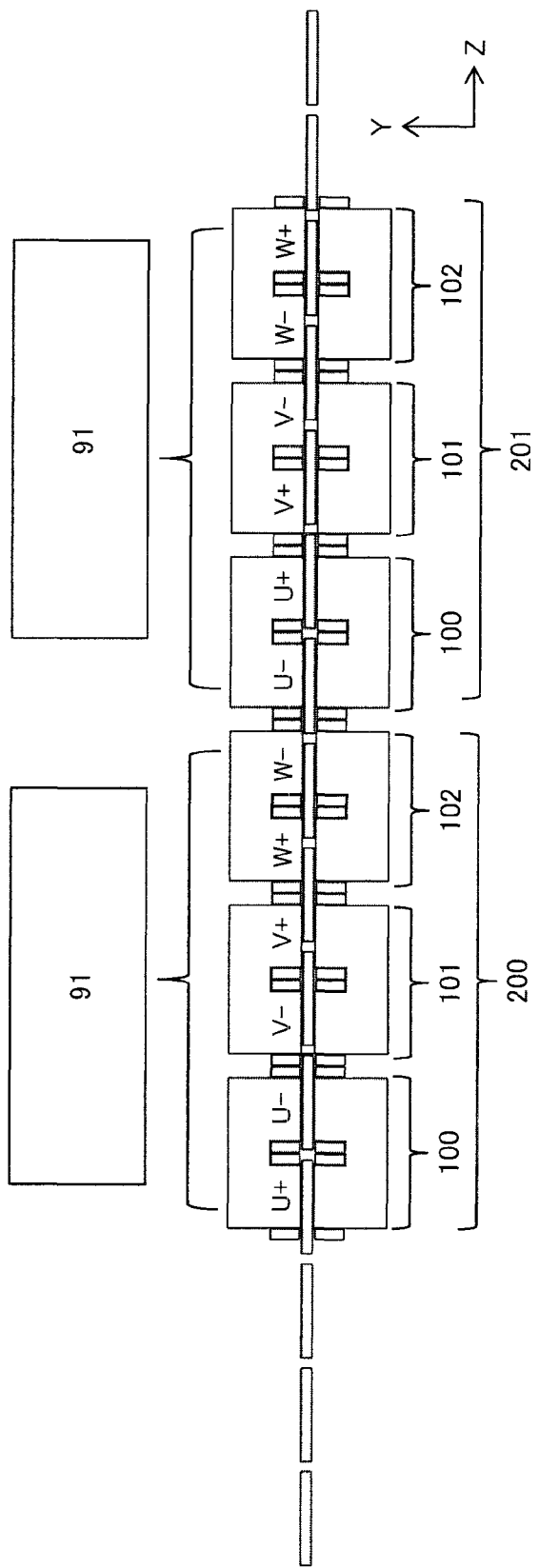
FIG. 28 is a sectional view showing the seventh embodiment shown in FIG. 27, as cut along the Y-Z plane.

A seventh embodiment of the linear motor according to the invention is shown in FIGS. 27, 28. The linear motor according to the present embodiment, shown in the figures, is substantially identical in configuration to the first embodiment, omitting therefore description in detail.

The present embodiment, shown in the figures, relates to a linear motor having a configuration where a plurality of armatures are disposed against the permanent magnets 5 adjacent to each other, alternating in respect of magnetization direction 51, and not less than two units of the armatures are provided against one mover.

More specifically, a drive unit 91 is connected to each one of two linear motors including a linear motor 200 made up of three armatures 100, 101, 102, and a linear motor 201 made up of three armatures 100, 101, 102, respectively.

With the present embodiment, described as above, the drive units 91 each can cause the linear motors 200, 201 to individually produce thrust. Since the two linear motors 200, 201 each can produce thrust in the same direction, a large thrust can be produced. Further, it is possible to cause the linear motor to act as a brake by causing the linear motor to work in the opposite direction. Furthermore, it is also possible to have a configuration where respective thrusts that can be developed by the two linear motors 200, 201 differ from each other.

Further, the configuration of the present embodiment has a merit in that a drive system can be made up of a small-capacity drive unit by supplying a current necessary for producing thrust from the two drive units 91. Furthermore, wiring between the two linear motors 200, 201 is no longer required, so that the number of empty spaces for wiring can be reduced, and therefore, miniaturization of a linear-motor drive system in the whole can be realized.

The drive unit 91 is a device for use in supplying a current to the winding, and for the drive unit 91, use is made of an inverter, a servo amplifier, and so forth. In the case of supplying a current to one phase, it is also possible to make connection via a single-phase amplifier.

Further, it is also possible that individual power supplies are connected to the respective armatures 100, 101, 102, and a current is adjusted on an armature-by-armature basis to thereby control thrust.

Eighth Embodiment

Figure 29:
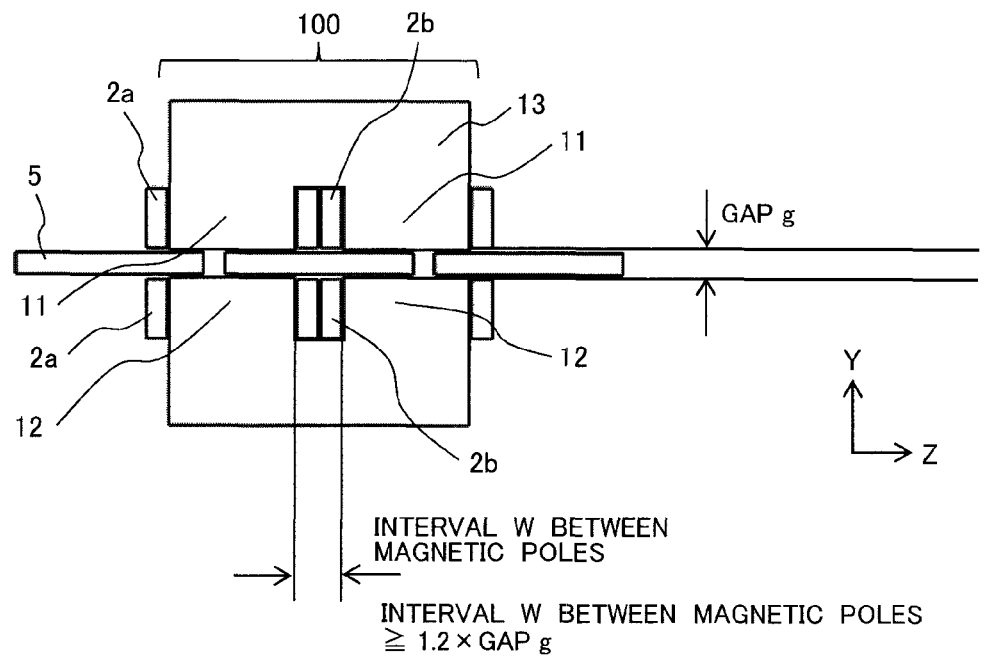
FIG. 29 is a view showing an eighth embodiment of the linear motor according to the invention, for use in describing a relationship between a gap g formed between a first magnetic pole tooth and a second magnetic pole tooth and an interval W between respective magnetic poles of the first and second magnetic pole teeth and the first and second magnetic pole teeth, adjacent to the former, in the traveling direction of the mover.

An eighth embodiment of the linear motor according to the invention is shown in FIG. 29. The linear motor according to the present embodiment, shown in the figure, is substantially identical in configuration to the first embodiment, omitting therefore description in detail.

With the present embodiment, shown in the figure, if a gap formed between a first magnetic pole tooth 11 and a second magnetic pole tooth 12 is defined "g", and an interval between a magnetic pole of the first and second magnetic pole teeth 11, 12 and a magnetic pole of the first and second magnetic pole teeth 11, 12, adjacent to the former, in the traveling direction (the z-direction) of the mover or the armature, is defined "W", a relationship between the gap g and the interval W between the magnetic poles is expressed by a formula:

$$W \geq 1.2 \times g$$

More specifically, thrust characteristics undergo a large change due to a change in dimension of the gap g between the first magnetic pole tooth 11 and the second magnetic pole tooth 12, and a change in the interval W between the magnetic pole of the first and second magnetic pole teeth 11, 12 and the magnetic pole of the first and second magnetic pole teeth 11, 12, adjacent to the former, in the traveling direction of the mover. For example, if the linear motor is manufactured such that the interval W between the magnetic poles is rendered narrower, while keeping the gap g constant, there occurs an increase in the number of magnetic fluxes traversing between the magnetic poles adjacent to each other in the traveling direction of the mover. The magnetic flux traversing between the magnetic poles adjacent to each other without acting on the permanent magnet 5 is a leakage flux that is a magnetic flux making no contribution to the thrust. Due to a decrease in the number of the leakage fluxes, reactive power and leakage inductance can be reduced.

Accordingly, with the present embodiment, the decrease in the number of the leakage fluxes is achieved if the relationship between the dimension of the gap g and the interval W between the magnetic poles is represented by the following formula:

$$\text{interval } W \text{ between magnetic poles} \geq 1.2 \times \text{gap } g.$$

The grounds for adoption of the formula, interval W between the magnetic poles$\geq 1.2 \times$gap g, are described hereinafter with reference to FIG. 30.

Figure 30:
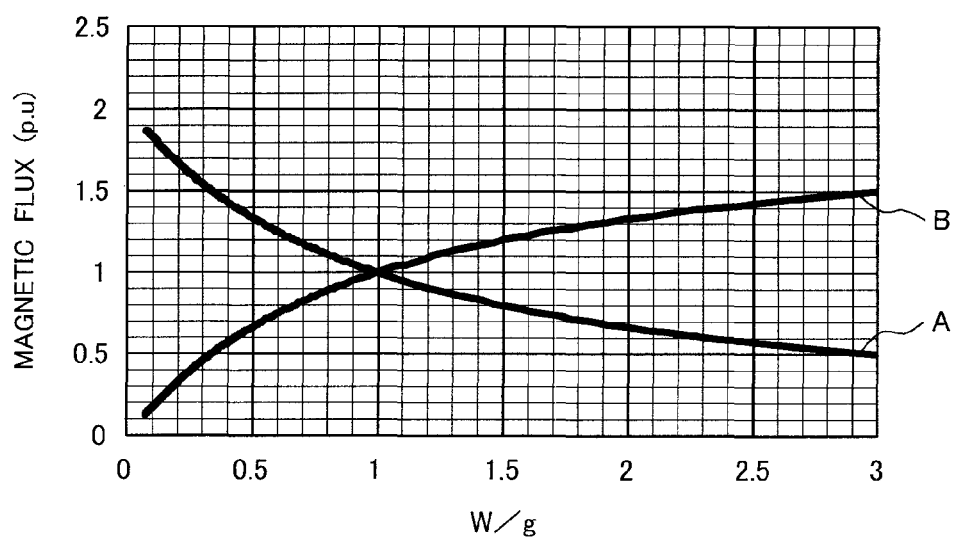
FIG. 30 is a characteristics view showing a relationship between a ratio of an interval W between magnetic poles to a gap g (W/g), and flux content, in the eighth embodiment, indicating respective characteristics of an ineffective flux (leakage flux), and an effective flux (contributing to thrust)

FIG. 30 is a view showing respective characteristics of an ineffective flux (leakage flux) A, and an effective flux (contributing to thrust) B, in a graph where the horizontal axis indicates a ratio of an interval W of magnetic poles to gap g (W/g), and the vertical axis indicates magnetic flux.

Assuming that a value of the effective flux B as well as the ineffective flux A is 1 at W/g=1, it is found from observation of variation in magnetic flux when W/g varies that the ineffective flux A rapidly increases at W/g=1.2 or less, while the effective flux B decreases, as shown in the figure. In contrast, it is apparent that the effective flux B contributing to the thrust has increased at the interval W between the magnetic poles/the gap g$\geq 1.2$.

It can be reasoned from this result that if the formula described as above is satisfied, a linear motor relatively large in thrust can be provided.

With the present embodiment described as above, needless to say, the same effect as obtained in the first embodiment is obtained, and the leakage flux can be reduced. Further, it becomes possible to reduce the reactive power and the leakage inductance as well. As a result, deterioration in thrust is prevented, so that the linear motor relatively large in thrust can be obtained.

Ninth Embodiment

Figure 31:
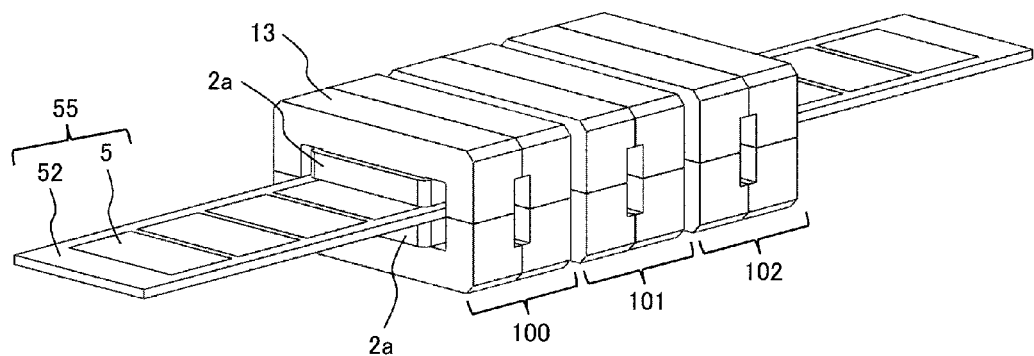
FIG. 31 is a perspective view showing a ninth embodiment of the linear motor according to the invention.

A ninth embodiment of the linear motor according to the invention is shown in FIG. 31. The linear motor according to the present embodiment, shown in the figure, is substantially identical in configuration to the first embodiment, omitting therefore description in detail.

The present embodiment shown in the figure represents an embodiment showing an example of a manner for holding the permanent magnet 5 described in the first embodiment through the eighth embodiment.

With the present embodiment, the permanent magnet 5 is fixedly attached to a permanent-magnet holding member 52, as shown in the figure. Further, with the present embodiment, a mover 55 is made up of the permanent magnet 5, and the permanent-magnet holding member 52, and the armatures 100, 101, 102 are mounted on a foundation (not shown) to be fixed thereto, the mover 55 being held by a holding means fixed to the armatures 100, 101, 102 and/or the foundation.

Even with the adoption of a configuration of the present embodiment, described as above, the same effect as obtained in the first embodiment is obtained.

Tenth Embodiment

Figure 32:
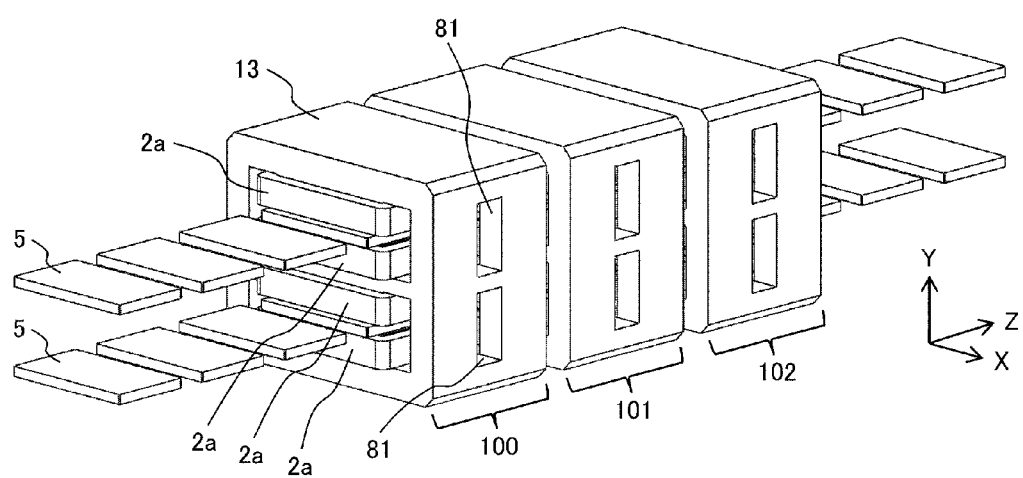
FIG. 32 is a perspective view showing a tenth embodiment of the linear motor according to the invention.
Figure 33:
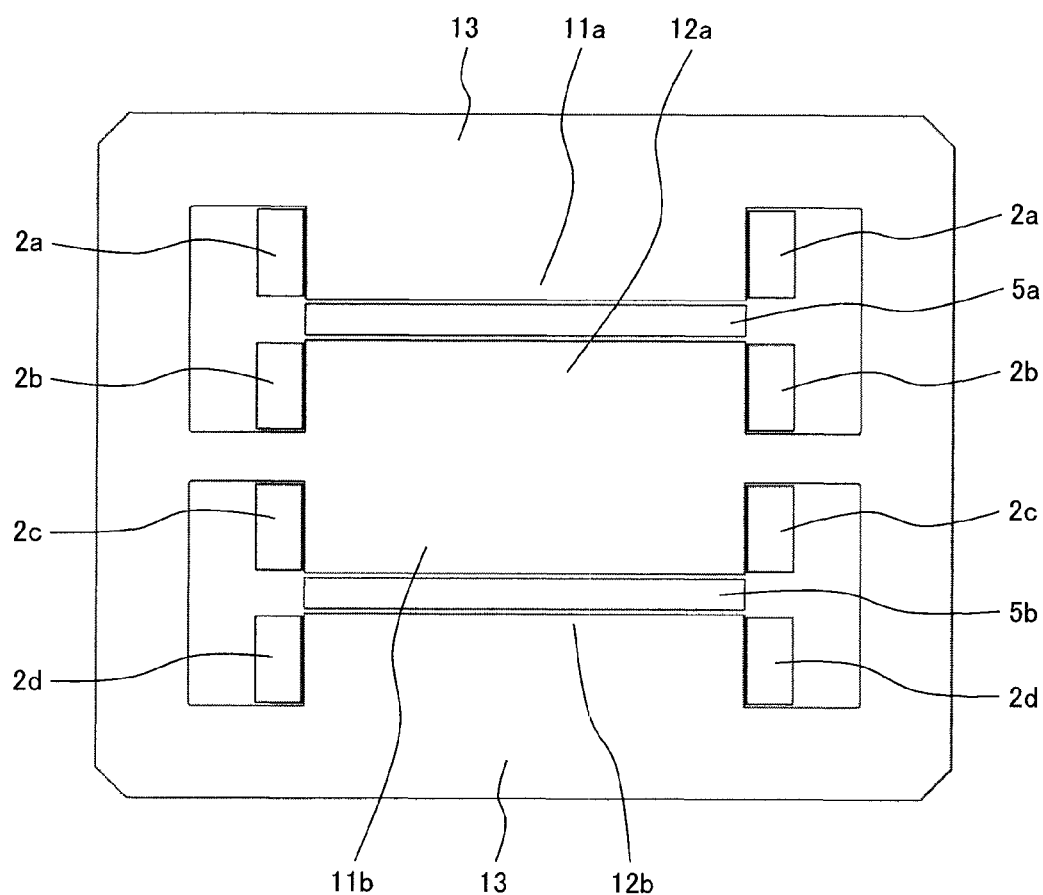
FIG. 33 is a front view of the linear motor according to the tenth embodiment in FIG. 32.
Figure 34:
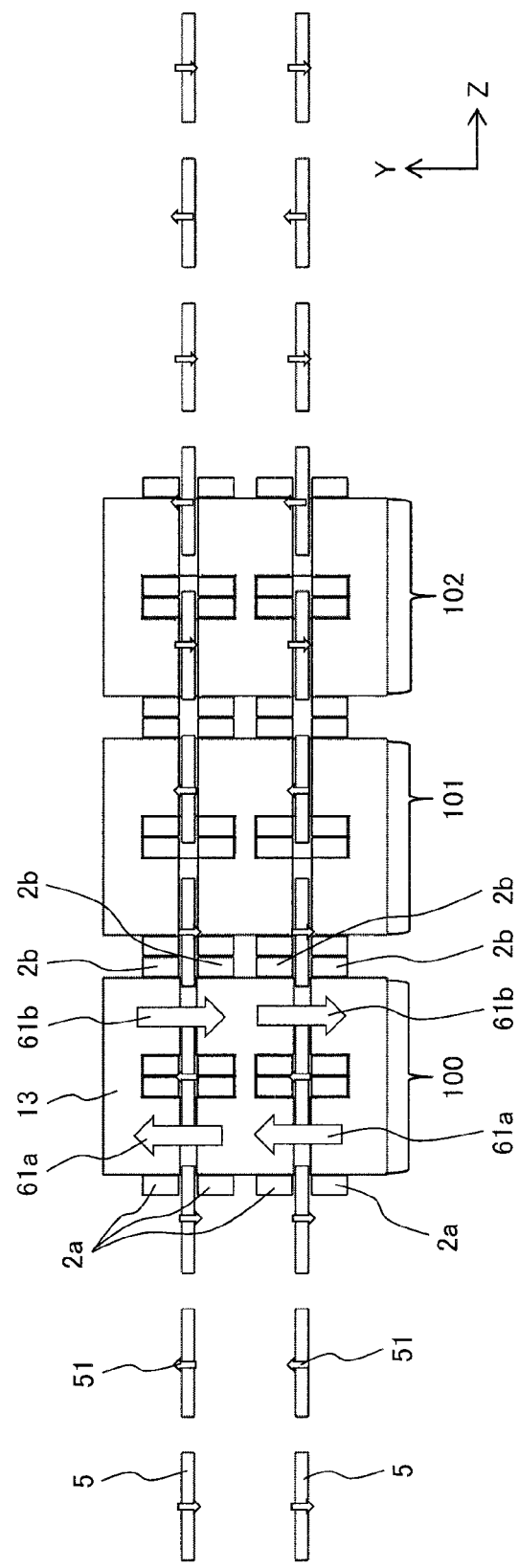
FIG. 34 is a sectional view of the linear motor according to the tenth embodiment in FIG. 32, as cut along the Y-Z plane.

A tenth embodiment of the linear motor according to the invention is shown in FIGS. 32 through 34. The linear motor according to the present embodiment, shown in the figures, is substantially identical in configuration to the first embodiment, omitting therefore description in detail.

The present embodiment shown in the figures has a configuration in which the permanent magnets 5 are lined up in two tiers, an upper tier and a lower tier, and the armatures 100, 101, 102 are in common with the upper tier and the lower tier. More specifically, as shown in FIG. 33, a first magnetic pole tooth 11*a*, and a second magnetic pole tooth 12*a* are disposed in such a way as to tuck away a permanent magnet 5*a* in the upper tier while a first magnetic pole tooth 11*b*, and a second magnetic pole tooth 12*b* are disposed in such a way as to tuck away a permanent magnets 5*b* in the lower tier.

By so doing, magnetic fluxes generated by windings 2*a*, 2*b* in the upper tier, and magnetic fluxes generated by windings 2*c*, 2*d* in the lower tier act on the permanent magnet 5*a* and the permanent magnet 5*b*, respectively, so that thrust can be enhanced, and miniaturization of the linear motor can be attained through sharing of a magnetic circuit.

Even with the adoption of a configuration of the present embodiment, described as above, needless to say, the same effect as obtained in the first embodiment is obtained, but also the magnetic material 13 for linking the first magnetic pole tooth 11 to the second magnetic pole tooth 12 can be shared, thereby enabling the miniaturization of the magnetic circuit to be realized.

Further, the configuration of the present embodiment, described as above, is an example of a configuration in which the permanent magnets 5 are lined up in the two tiers, however, it is to be pointed out that the configuration is not limited thereto if the same advantageous effect is obtainable, and that the permanent magnets 5 may be vertically lined up in multitude of tiers.

Still further, with the respective embodiments of the invention, described as above, there is described the configuration in which the permanent magnets are disposed on the mover, however, even in the case where the magnetic material in place of the permanent magnets is disposed on the mover, thrust can be produced.

Eleventh Embodiment

Figure 35:
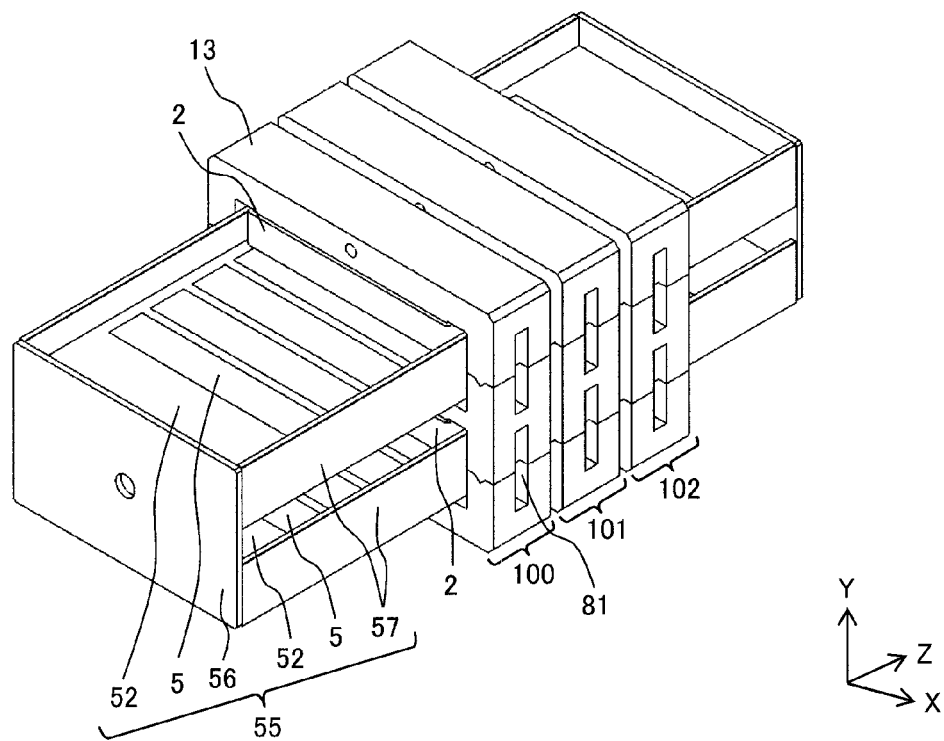
FIG. 35 is a perspective view of the eleventh embodiment of the linear motor according to the invention.
Figure 36:
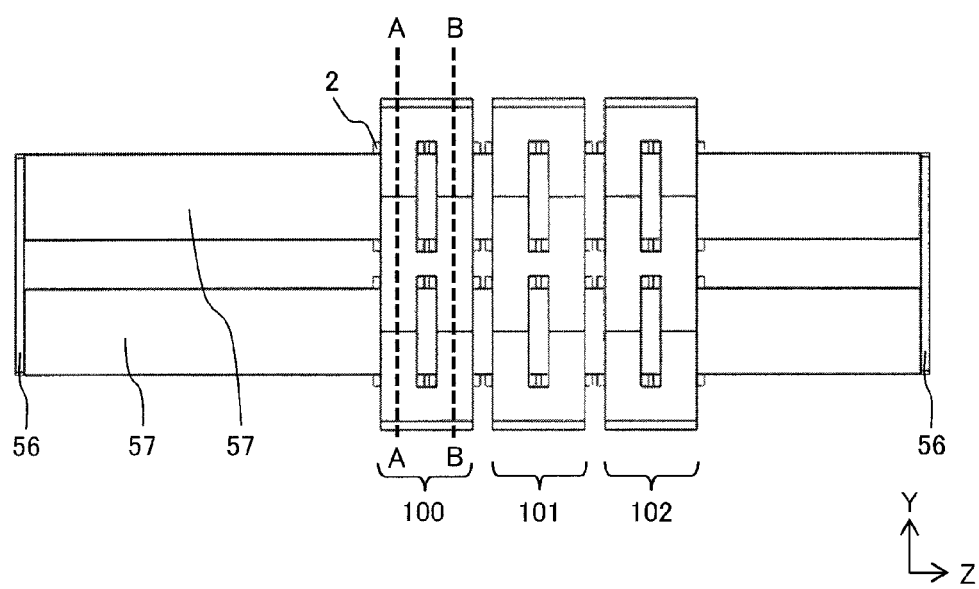
FIG. 36 is a side view of the linear motor shown in FIG. 35.

In FIGS. 35 through 37 (B), an eleventh embodiment of the linear motor according to the invention is shown. The linear motor according to the present embodiment, shown in those figures, is similar in configuration to the first embodiment, omitting therefore repeated description in detail.

In FIGS. 35 through 37 (B), the linear motor according to Embodiment 1 is overlaid on another, so as to be stacked in two stages, in the y-axis direction, in an attempt to share armatures, thereby realizing miniaturization.

Now, magnetic circuits of the linear motor according to the present embodiment are described below with reference to FIGS. 37(A) and 37(B).

Figure 37A:
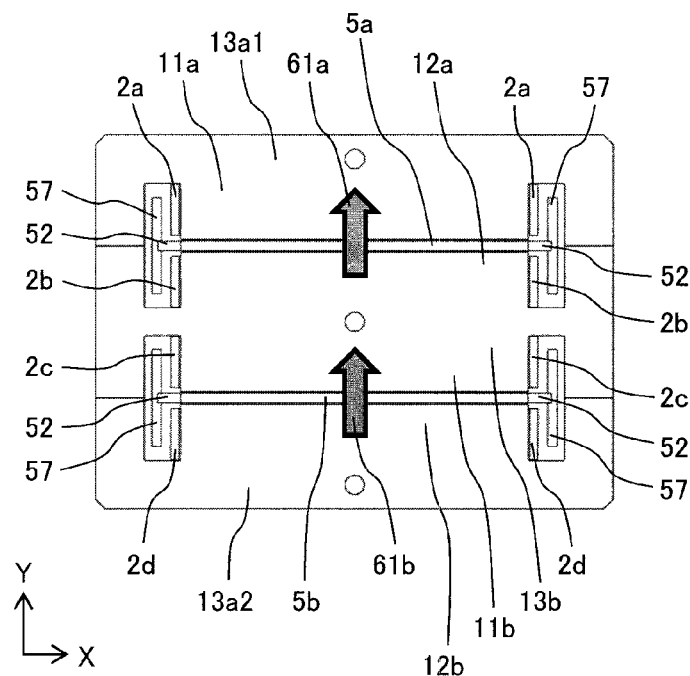
FIG. 37(A) is a sectional view taken on line A-A of FIG. 36.

In FIG. 37(A) showing a sectional view taken on line A-A of FIG. 36, the linear motor according to the present embodiment is of a three-division construction including a first magnetic pole tooth 11, a second magnetic pole tooth 12, and a magnetic material 13 for linking the first magnetic pole tooth 11 to the second magnetic pole tooth 12. The linear motor is made up of a first magnetic pole tooth 11a in the upper stage, a magnetic material 13a1 on the upper side in the upper stage, for linking the first magnetic pole tooth 11 to the second magnetic pole tooth 12, a second magnetic pole tooth 12b in the lower stage, a magnetic material 13a2 on the lower side in the lower stage, for linking the first magnetic pole tooth 11 to the second magnetic pole tooth 12, a second magnetic pole tooth 12a in the upper stage, a first magnetic pole tooth 11b in the lower stage, and a magnetic material 13b in the central part, for linking the first magnetic pole tooth 11 to the second magnetic pole tooth 12. Further, a winding 2a is disposed in the first magnetic pole tooth 11a in the upper stage, a winding 2b is disposed in the second magnetic pole tooth 12a in the upper stage, a winding 2c is disposed in the first magnetic pole tooth 11b in the lower stage, and a winding 2d is disposed in the second magnetic pole tooth 12b in the lower stage, respectively.

Figure 37B:
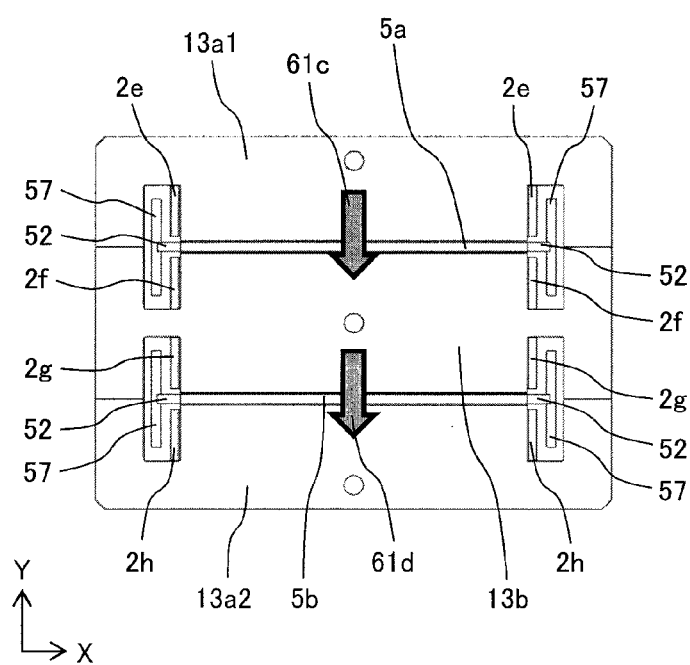
FIG. 37(B) is a sectional view taken on line B-B of FIG. 36.

In FIGS. 37(A) and 37(B), the directions of respective magnetic fluxes generated by the windings 2a, 2b are indicated by the arrow 61a while the directions of respective magnetic fluxes generated by the windings 2c, 2d are indicated by the arrow 61b.

By causing the magnetic flux 61a working on a mover 55 in the upper stage to be oriented in the same direction as that of the magnetic flux 61b working on a mover 55 in the lower stage, as indicated in the relevant figures, to thereby establish a magnetic path formed by the magnetic material 13a1 on the upper side in the upper stage, the magnetic material 13a2 on the lower side in the lower stage, and the magnetic material 13b in the central part, whereupon respective magnetic fluxes generated by the windings 2a, 2b, opposed to a permanent magnet 5a in the upper stage, come to act on a permanent magnet 5b in the lower stage, as well. Meanwhile, respective magnetic fluxes generated by the windings 2c, 2d, opposed to the permanent magnet 5b in the lower stage, come to act on the permanent magnet 5a in the upper stage, as well. Due to this effect, thrust per unit volume (thrust density) can be enhanced as compared with a case of the linear motor provided with the mover just in one stage, as described in the first embodiment (effect A).

Further, there is described below the magnetic circuit of a magnetic material adjacent to a part shown in the section taken on line A-A (FIG. 37(A)). A magnetic-circuit configuration of magnetic pole teeth adjacent to the magnetic pole teeth in the A-A section is described below with reference to FIG. 37(B), as the section taken on line B-B in FIG. 36.

In FIG. 37(B), respective magnetic fluxes generated by windings 2e, 2f, come to act on the permanent magnet 5b in the lower stage via the magnetic material 13a1 on the upper side in the upper stage, the magnetic material 13a2 on the lower side in the lower stage, and the magnetic material 13b in the central part, whereas respective magnetic fluxes generated by windings 2g, 2h, come to act on the permanent magnet 5a on the upper side via the magnetic material 13a1 on the upper side in the upper stage, the magnetic material 13a2 on the lower side in the lower stage, and the magnetic material 13b in the central part. If respective magnetic fluxes generated by the magnetic poles adjacent to each other are reversely-oriented from each other, this will enable a magnetic-path sectional area to be enlarged due to a magnetic-flux path occurring in the X-Y plane shown in FIGS. 37(A) and 37(B), and a magnetic-flux path occurring in the Y-Z plane shown in FIG. 36, so that the thrust density can be further enhanced (effect B).

With the present embodiment, there is described the case where the armature 100 includes two magnetic pole teeth disposed side by side in the z-direction, however, even in the case where one magnetic pole tooth is disposed in the z-direction, it is possible to miniaturize the linear motor due to the effect A by causing respective magnetic fluxes generated by the windings to mutually act on each other if the mover 55 is installed in multistages, and the magnetic circuit is shared. Furthermore, if a plurality of pieces of magnetic poles are provided side-by-side in the z-direction, this will enable a magnetic-path sectional area to be enlarged, so that further miniaturization can be realized.

Accordingly, the effect A is obtainable without limitation to the case where the movers are disposed side by side in the z-direction, and if the respective magnetic fluxes generated by the windings, in a multistage configuration, are oriented in the same directions, and the magnetic circuit is shared such that the magnetic fluxes, in the multistage configuration, can mutually act on each other, the effect can be obtained.

Figure 38:
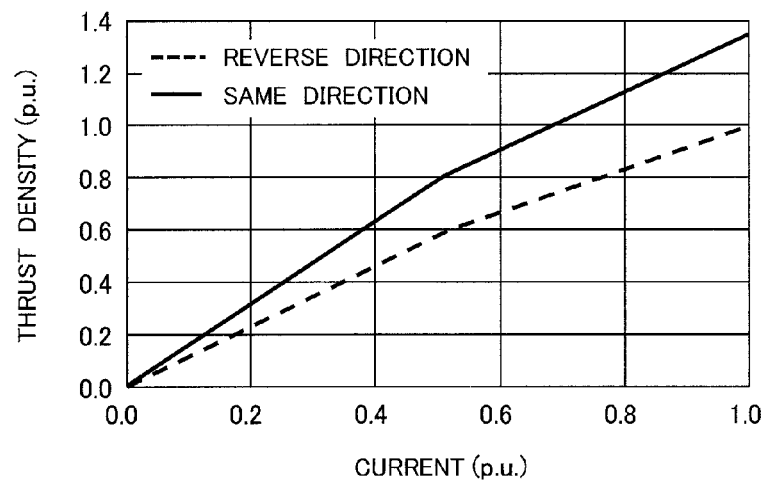
FIG. 38 is a current thrust-density plot indicating effects of the eleventh embodiment of the linear motor according to the invention.
Figure 39:
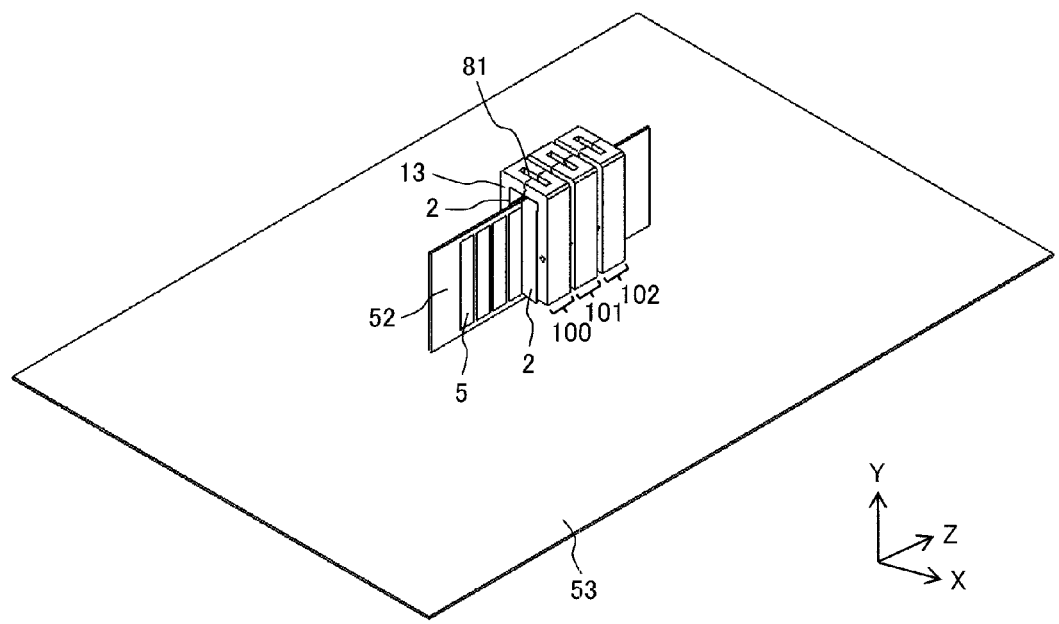
FIG. 39 is a perspective view of the twelfth embodiment of the linear motor according to the invention.

FIG. 38 shows the results of a magnetic-field analysis on the linear motor according to the present embodiment, indicating both thrust density in the case where respective magnetic fluxes generated by the windings provided in two stages in the Y-direction are oriented in the same direction, and thrust density in the case where the respective magnetic fluxes are reversely oriented from each other.

Figure 8:
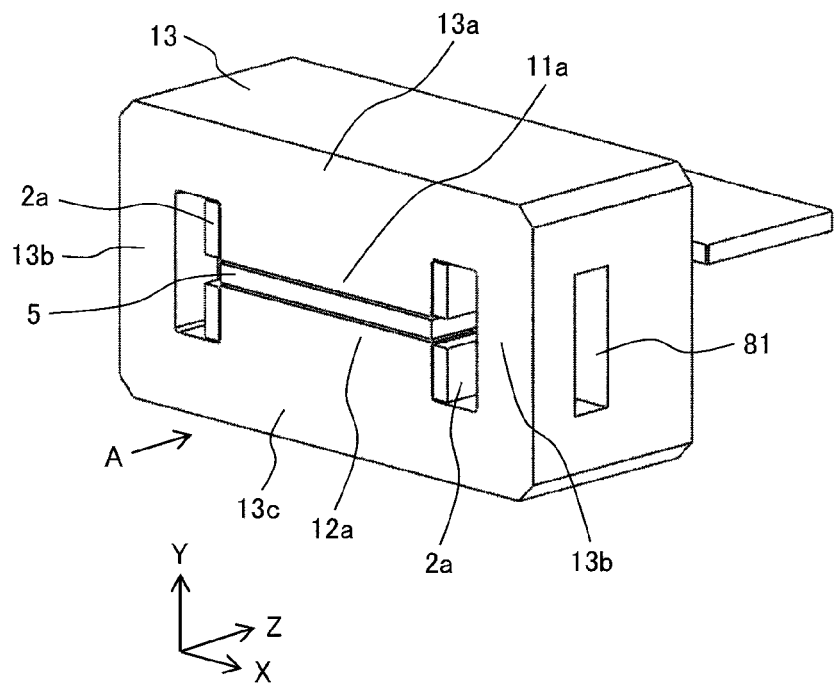
FIG. 8 is a perspective view showing the armature corresponding to the one phase, shown in FIG. 7, as cut along the X-Y plane.
Figure 9:
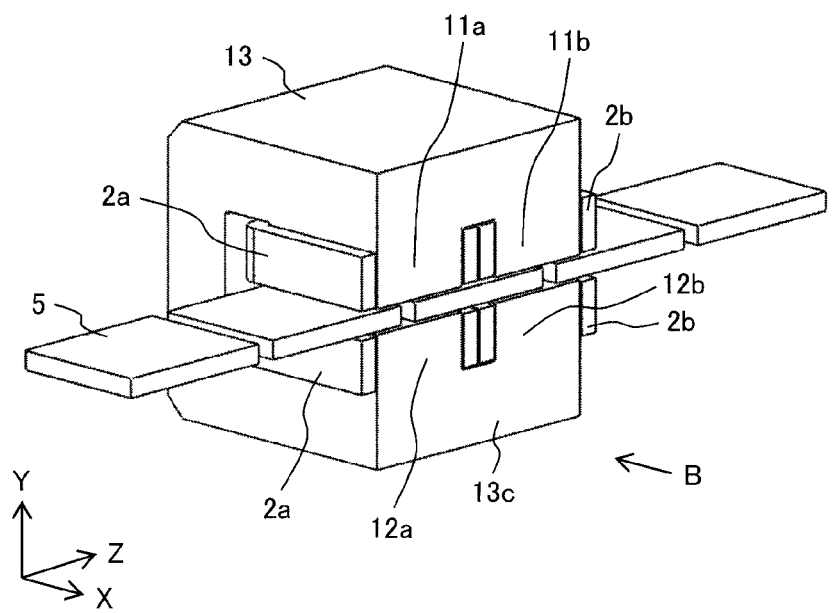
FIG. 9 is a perspective view showing the armature corresponding to the one phase, shown in FIG. 7, as cut along the Y-Z plane.

FIG. 8 shows results obtained by comparing the thrust when the respective magnetic fluxes generated by the windings are oriented in the same direction with the thrust when the respective magnetic fluxes are reversely oriented from each other by assuming that rated thrust is 1.0 (p. u.) at rated current 1.0 (p. u.) in the latter case.

As shown in FIG. 38, it is evident that if the respective magnetic fluxes generated by the windings provided in the two stages are oriented in the same direction, this will cause the thrust density to be improved 1.36 times as much as the thrust density in the case where the respective magnetic fluxes are reversely oriented from each other.

With the present embodiment, the case of the mover 55 in the two-stage configuration is described, however, even in the case of a configuration in not less than three stages, the thrust density can be similarly enhanced. Further, if the respective magnetic circuits in the upper and lower stages are divided among the magnetic material 13a1 on the upper side in the upper stage, the magnetic material 13a2 on the lower side in the lower stage, and the magnetic material 13b in the central part, thereby increasing the number of the magnetic materials 13b in the central part, positioned between the magnetic material 13a1 on the upper side in the upper stage, and the magnetic material 13a2 on the lower side in the lower stage, this will enable a multistage configuration to be set up with ease. In this case, since respective magnetic fluxes of the plural windings mutually act on each other, the armature can be rendered smaller in construction.

Thus, with the present embodiment, it is possible to realize reduction in the construction of the linear motor through sharing of the magnetic circuits, and enhancement in thrust, due to reduction in magnetic resistance.

Further, with the linear motor according to the present embodiment, there is the need for enhancement in the strength of the mover 55, due to enhancement attained in the thrust, and it is therefore conceivable to increase the thickness of the mover 55 in order to raise the strength thereof. However, if the thickness of the mover 55 is increased, this will cause magnetic resistance to increase, resulting in a decrease in thrust density.

Accordingly, a side plate 57 is provided on both sides of a permanent-magnet holding member 52 with a permanent magnet 5 disposed therein, as shown in FIG. 35. By so doing, the strength of the mover 55 is enhanced without increasing the thickness thereof. In addition, a multistage configuration is adopted for the mover 55 with the side plate 57 attached thereto, and a connecting plate 56 is attached to the respective ends of the mover 55, thereby enabling a substantial increase in rigidity of the mover 55 to be realized. By so doing, the rigidity of the mover 55 can be enhanced without causing an increase in magnetic resistance, and it is therefore possible to solve a problem with the strength of the mover 55, as posed by a linear motor large in thrust and thrust density.

Twelfth Embodiment

In FIGS. 39 through 42, a twelfth embodiment of the linear motor according to the invention is shown. The linear motor according to the present embodiment is similar in configuration to Embodiment 1 and Embodiment 2, respectively, omitting therefore repeated description in detail.

The linear motor according to the present embodiment, shown in the relevant figures, represents an embodiment where a magnetic material 13, for linking a first magnetic pole tooth 11 to a second magnetic pole tooth 12, is cut away in order to enhance the rigidity of a mover 55.

That is to say, the magnetic material 13, for linking the first magnetic pole tooth 11 to the second magnetic pole tooth 12, making up armatures 100 through 102, is cut away. Then, a permanent-magnet holding member 52 with a permanent magnet 5 disposed therein is fixed to a base plate 53, thereby lessening deformation occurring to the permanent-magnet holding member 52, against a large thrust.

Figure 40:
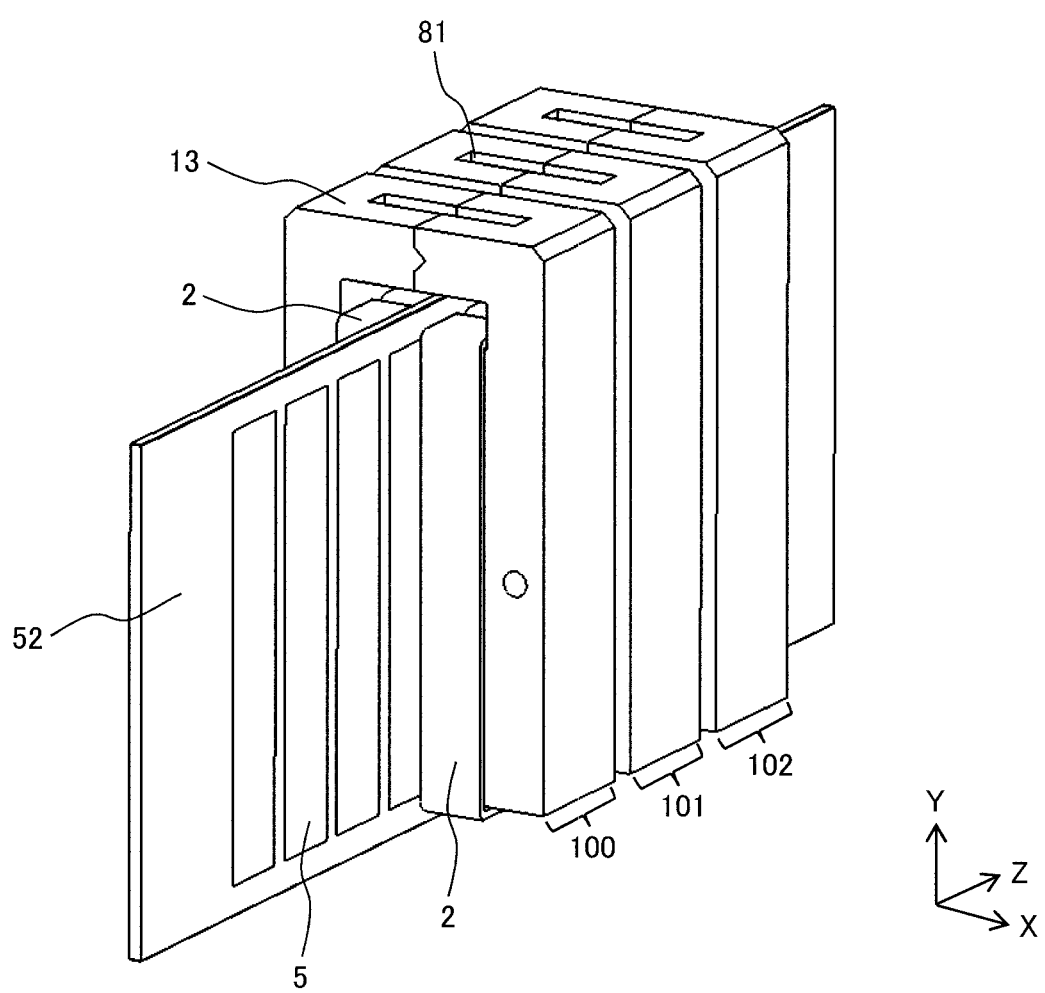
FIG. 40 is a perspective view of a linear motor according to the twelfth embodiment, where a part of a magnetic material for linking a first magnetic pole tooth to a second magnetic pole tooth, is cut away.
Figure 41:
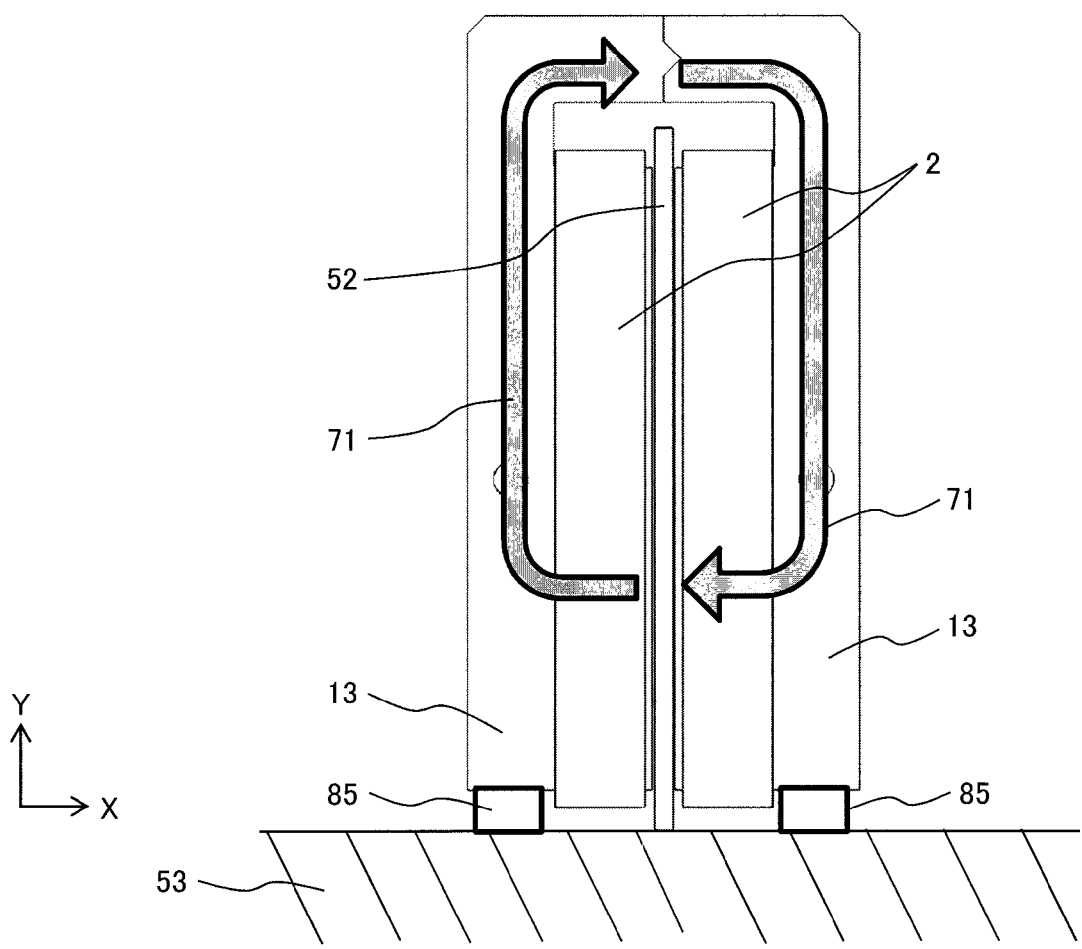
FIG. 41 is a view showing magnetic fluxes generated by windings, in the X-Y plane of the twelfth embodiment.
Figure 42:
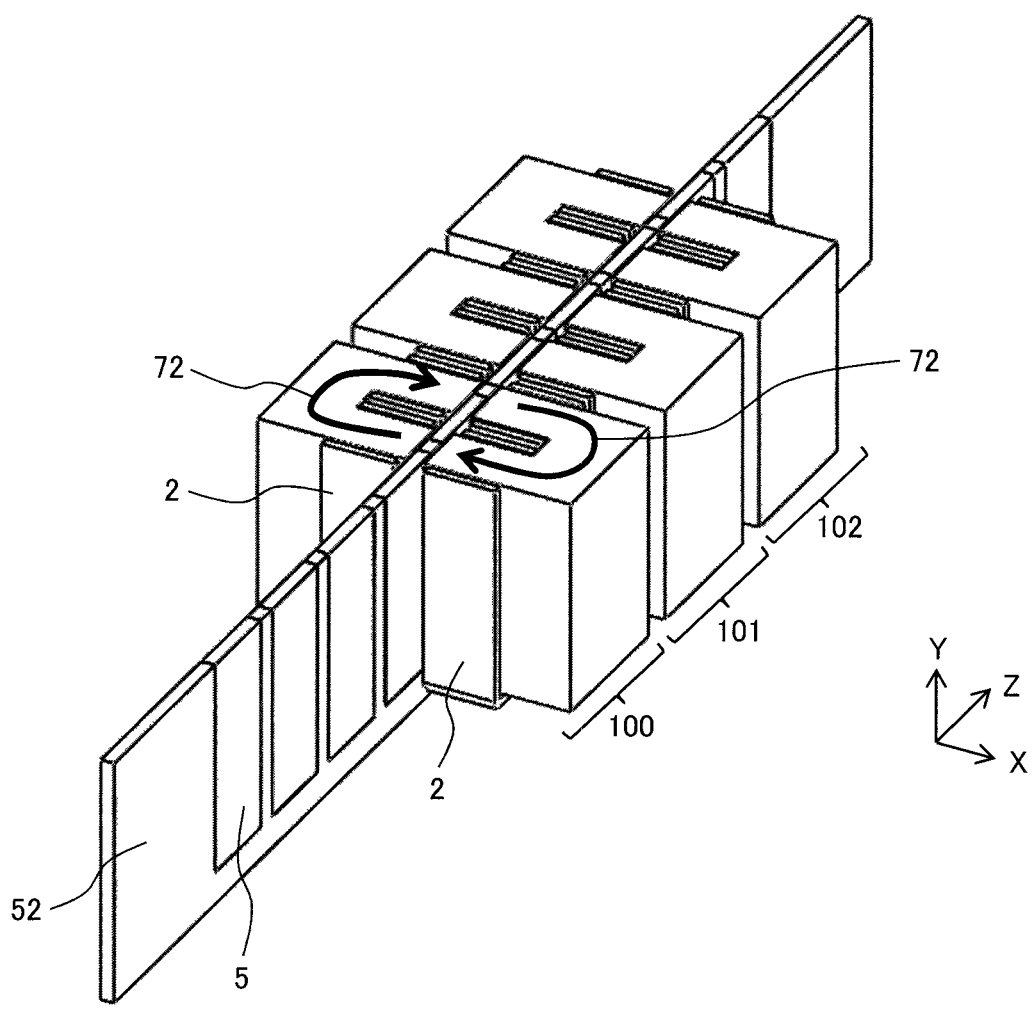
FIG. 42 is a view showing magnetic fluxes generated by windings, in the X-Z plane of the twelfth embodiment.

FIG. 40 shows an example of the linear motor where the magnetic material 13, for linking the first magnetic pole tooth 11 to the second magnetic pole tooth 12, is cut away. FIG. 41 shows magnetic fluxes in the X-Y plane of the linear motor of FIG. 40, and FIG. 42 shows magnetic fluxes in the X-Z plane of the linear motor of FIG. 40. If a plurality of magnetic paths are made up, this will cause reduction in magnetic resistance, so that the linear motor can be miniaturized.

Further, according to the configuration of the third embodiment, the permanent-magnet holding member 52 with the permanent magnet 5 disposed therein is fixed to the base plate 53, thereby serving as a fixed side of the linear motor, while armatures 100, 101, 102, serve as a movable side of the linear motor, and the fixed side and the movable side travel relatively to each other.

As an example of a method for holding the fixed side in this case, a movable member holder 85 is provided between the fixed side and the movable side to thereby relatively hold a position as shown in FIG. 41. For the movable member holder 85, a guide roller, and an LM guide, etc. are used although not limited thereto.

Figure 43:
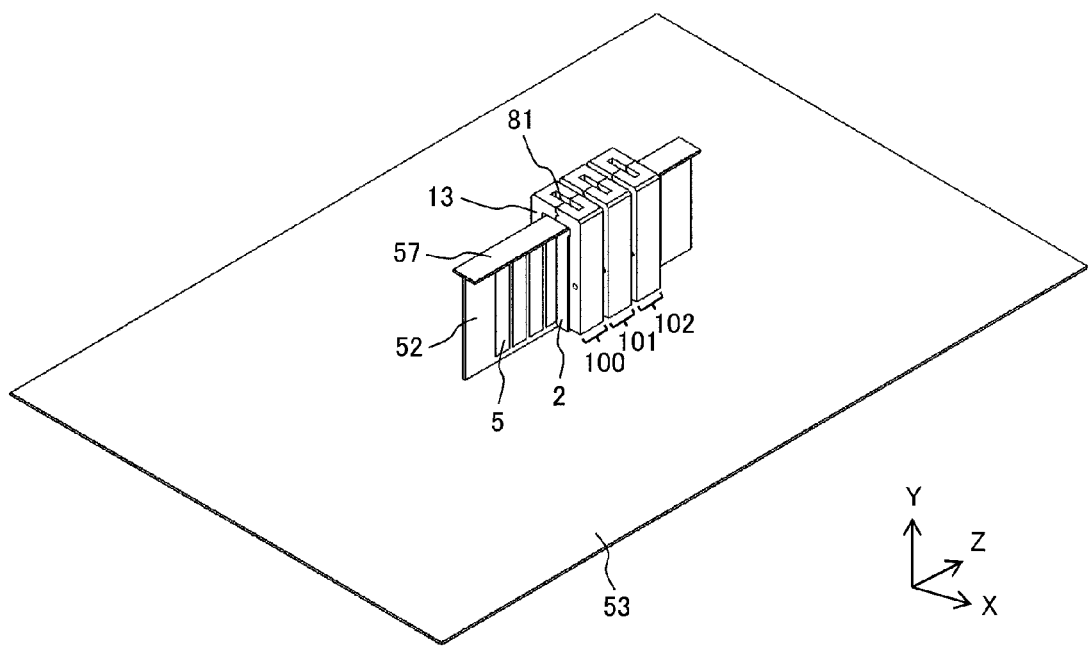
FIG. 43 is a perspective view showing an application example of the twelfth embodiment, provided with a side plate.
Figure 44:
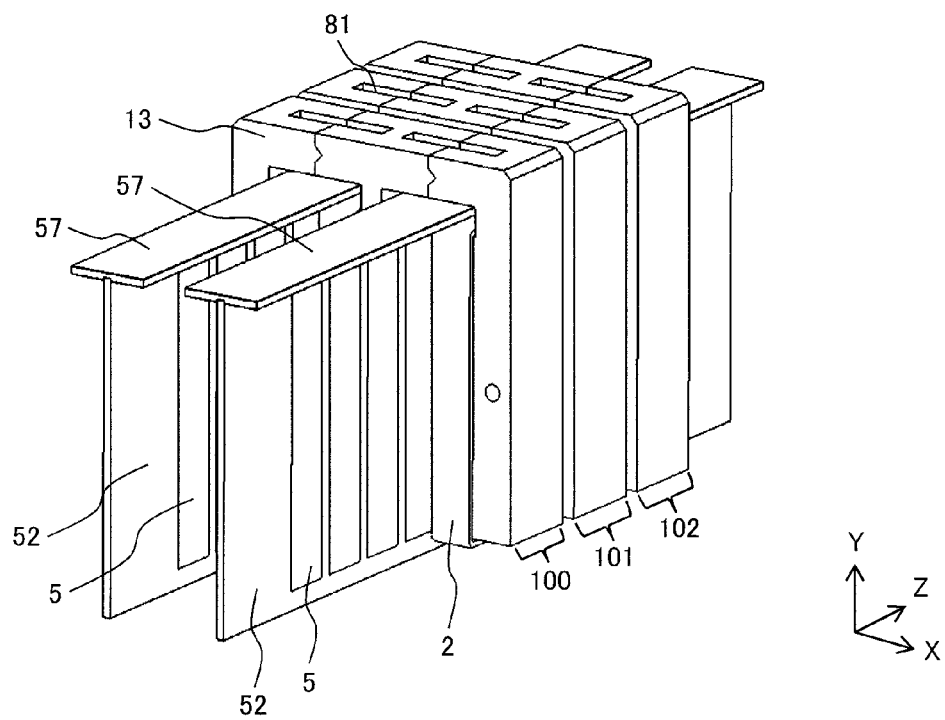
FIG. 44 is a perspective view showing an another application example of the linear motor according to the application example of FIG. 43.
Figure 45:
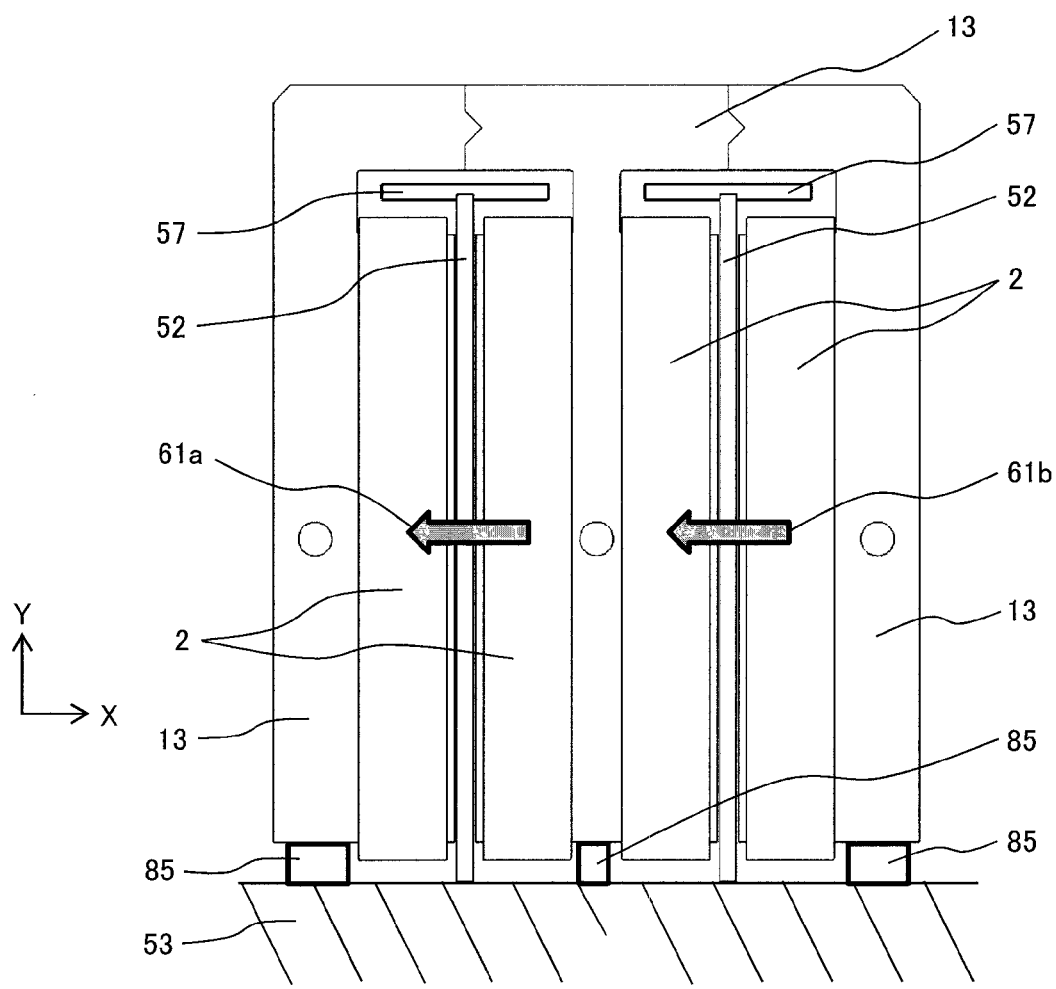
FIG. 45 is a front view of the application example of the linear motor of FIG. 43, showing the direction of magnetic fluxes.

In FIGS. 43 through 45, there is shown the construction of an application example of the present embodiment where the permanent-magnet holding member 52 is provided with the side plate 57 to thereby control the deformation of the permanent-magnet holding member 52. For example, the respective positions of the fixed side and the movable side can also be relatively kept by installing a guide roller, etc. on the top of the side plate 57, as shown in FIG. 45.

Even with the present embodiment having such a configuration as described above, the same effect as in the case of Embodiment 11 can be obtained.

Thirteenth Embodiment

Figure 46:
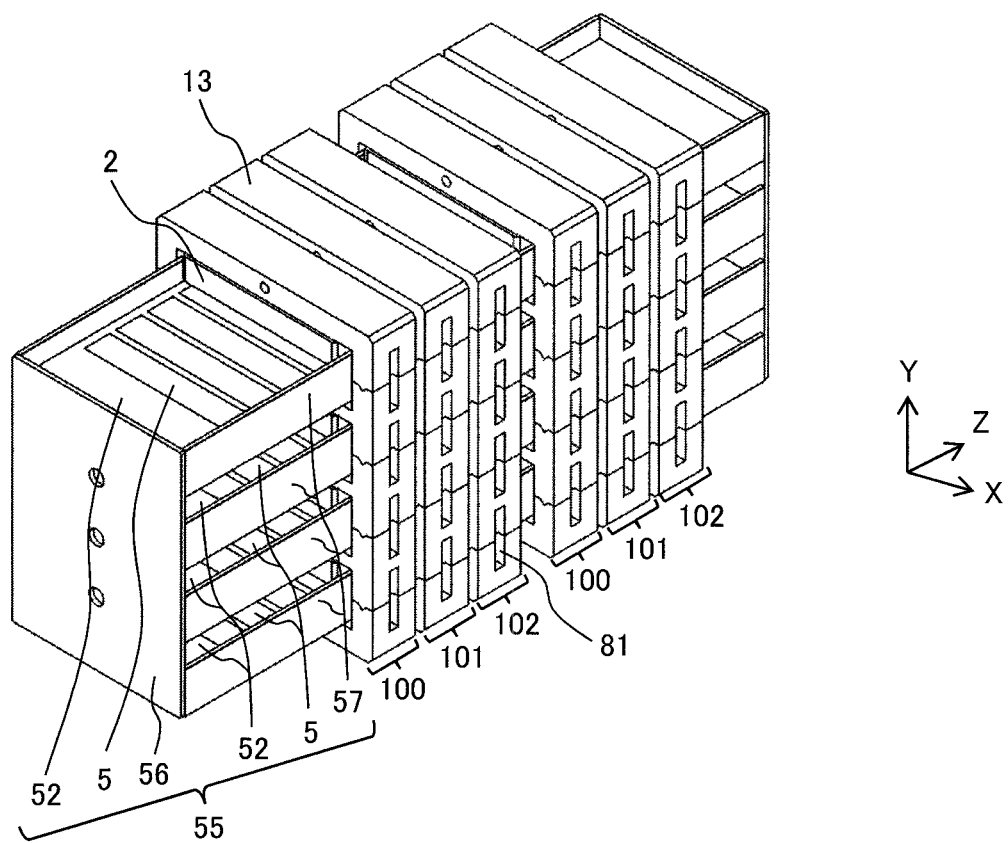
FIG. 46 is a perspective view of the thirteenth embodiment of the linear motor according to the invention.
Figure 47:
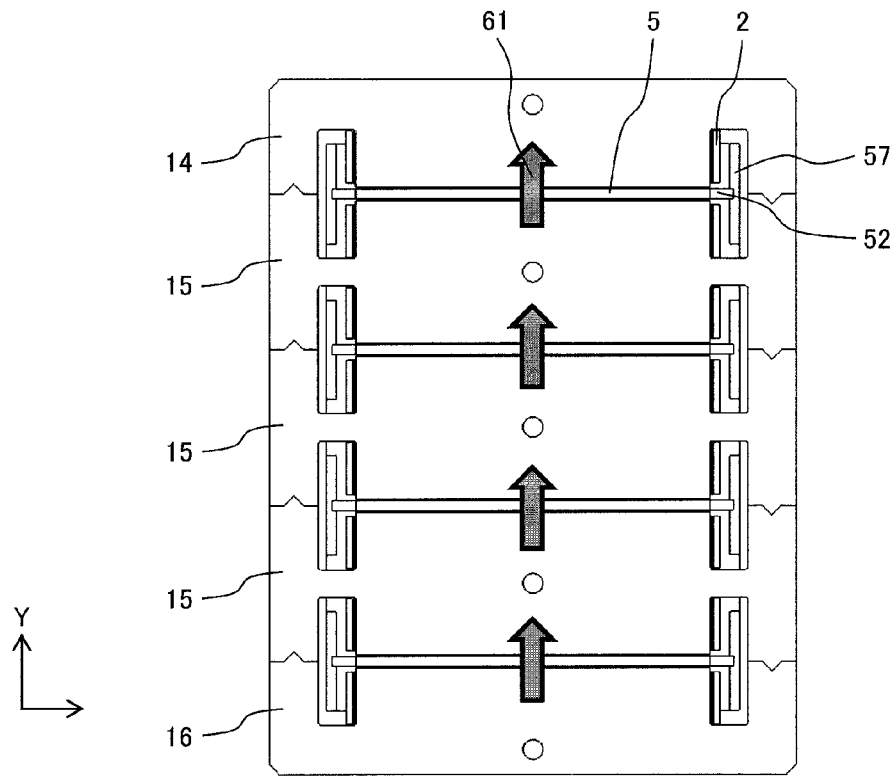
FIG. 47 is a view for use in describing the direction of magnetic fluxes in the thirteenth embodiment.

In FIGS. 46 and 47, a thirteenth embodiment of the linear motor according to the invention is shown. The linear motor according to the present embodiment, shown in FIGS. 46 and 47, is similar in configuration to the first and second embodiments, omitting therefore repeated description in detail.

The linear motor according to the present embodiment, shown in the relevant figures, represents an embodiment in which the number of stages for movers 55 is set to four with the mover 55 disposed in each of the four stages, and two groups of armatures 100, 101, 102 are disposed in the z-direction.

That is to say, the linear motor according to the present embodiment is provided with the armatures 100, 101, 102, each thereof including a magnetic material 14 (shape A) made up of a first magnetic pole tooth 11, and a magnetic material for linking the first magnetic pole tooth 11 to a second magnetic pole tooth 12, thereby forming a path for a magnetic flux, a magnetic material 16 (shape B) made up of the second magnetic pole tooth 12, and a magnetic material for linking the first magnetic pole tooth 11 to the second magnetic pole tooth 12, thereby forming a path for a magnetic flux, a magnetic material 15 (shape B) made up of the first magnetic pole tooth 11, the second magnetic pole tooth 12, and a magnetic material for linking the first magnetic pole tooth 11 to the second magnetic pole tooth 12, thereby forming a path for a magnetic flux, and respective windings wound around each of the magnetic pole teeth. Further, magnetic fluxes 61 generated by the respective windings disposed in each of the magnetic pole teeth, are oriented in the same direction, and the magnetic fluxes of the respective windings mutually act on each other, thereby enabling permeance to be increased.

Further, owing to a construction in which the magnetic material 15 made up of the first magnetic pole tooth 11, the second magnetic pole tooth 12, and the magnetic material for linking the first magnetic pole tooth 11 to the second magnetic pole tooth 12, thereby forming the path for the magnetic flux, is clamped between the magnetic material 14 made up of the first magnetic pole tooth 11, and the magnetic material for linking the first magnetic pole tooth 11 to the second magnetic pole tooth 12, thereby forming the path for a magnetic flux, and the magnetic material 16 made up of the second magnetic pole tooth 12, and the magnetic material for linking the first magnetic pole tooth 11 to the second magnetic pole tooth 12, thereby forming the path for the magnetic flux, the two magnetic materials differing in shape from each other (the shape A, the shape B) can be combined with each other to be easily turned into a multistage configuration. Furthermore, thrust and thrust density can be enhanced owing to sharing of both the magnetic flux, and the magnetic circuit, due to the multistage configuration as established. In addition, the rigidity of the movers can be enhanced through linkage of the movers in the multistages.

Figure 48:
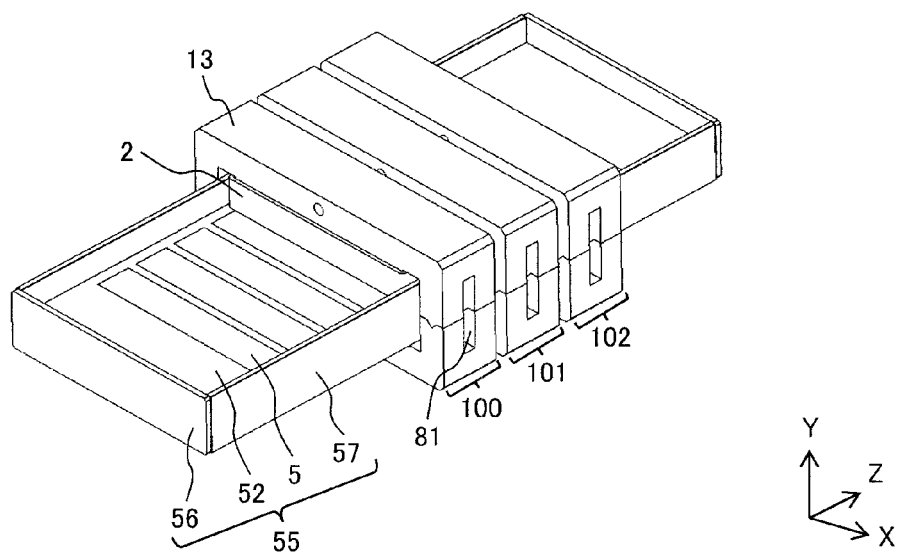
FIG. 48 is a modification of the linear motor according to the thirteenth embodiment.

Further, the present embodiment is not limited to the multistage configuration provided that the same effect is obtainable. For example, the present invention can be carried out even if the number of stages for the mover 55 is set to one, and one group of the armatures 100, 101, 102 are disposed in the z-direction, as shown in FIG. 48.

With the eleventh through thirteenth embodiments, an empty space for allowing an interconnect of the winding to pass therethrough is provided on a flank part of the armature, however, the present invention is not limited by the presence or absence of such a hole.

Now, it is to be pointed out that the present invention be not limited to the embodiments described as above and that the present invention may include various variations. For example, the embodiments described as above are explained about in detail simply for the purpose of assisting easy understanding of the present invention, and it is to be understood that the invention be not necessarily limited to the embodiment having all the configurations as explained. Further, a part of the configuration of a certain embodiment can be replaced with the configuration of another embodiment. Still further, the configuration of another embodiment can be added to part of the configuration of a certain embodiment. Furthermore, addition·deletion·replacement with the use of another configuration can be applied to part of the configuration of each of the embodiments.

REFERENCE SIGNS LIST 2a, 2b, 2c, 2d, 2e, 2f, 2g, 2h . . . winding, 5 . . . permanent magnet, 5a . . . permanent magnet in the upper stage, 5b . . . permanent magnet in the lower stage, 11 . . . first magnetic pole tooth, 11a . . . first magnetic pole tooth in the upper stage, 11b . . . first magnetic pole tooth in the lower stage, 12 . . . second magnetic pole tooth, 12a . . . second magnetic pole tooth in the upper stage, 12b . . . second magnetic pole tooth in the lower stage, 13, 14, 15, 16 . . . magnetic material, 13a1 . . . magnetic material on the upper side in the upper stage, 13a2 . . . magnetic material on the lower side in the lower stage, 13b . . . magnetic material in the central part, 51 . . . magnetization direction of the permanent magnet, 52 . . . permanent-magnet holding member, 53 . . . base plate, 55 . . . mover, 56 . . . connecting plate 57 . . . side plate, 60, 61a, 61b, 61c, 61d, 71, 72 . . . magnetic flux, 81, 81a . . . empty space, 85 . . . movable member holder, 91 . . . drive unit, 100, 101, 102 . . . armature, 200, 201 . . . linear motor

The invention claimed is:

1. A linear motor comprising:
   a mover formed by lining up a plurality of pieces of permanent magnets or magnetic materials side-by-side while inversing a magnetization direction thereof; and
   an armature, including:
   a first magnetic pole tooth, and a second magnetic pole tooth, disposed in such a way as to vertically tuck the permanent magnet or the magnetic material;
   a magnetic material for linking the first magnetic pole tooth to the second magnetic pole tooth, thereby forming a path for a magnetic flux; and
   windings disposed on the first magnetic pole tooth and the second magnetic pole tooth, respectively, together with at least two units of the armatures being lined up in the traveling direction of the mover or the armature, to be linked with each other by use of the magnetic material, the linear motor producing thrust for causing the mover and the armatures to make a relative horizontal movement, wherein at least two different flux paths for allowing a magnetic flux from each of the windings to pass therethrough are provided, wherein
   the magnetic material for linking the first magnetic pole tooth to the second magnetic pole tooth and a magnetic material for linking adjacent first magnetic pole teeth to adjacent second magnetic pole teeth, in the traveling direction of the mover or the armature, are divided.

2. The linear motor according to claim 1, wherein the at least two different flux paths for allowing the magnetic flux from each of the windings to pass therethrough include a first path where the magnetic flux from the winding reaches the first magnetic pole tooth from the magnetic material, the second magnetic pole tooth from the first magnetic pole tooth, and the magnetic material from the second magnetic pole tooth, and a second path reaching adjacent magnetic pole teeth in a direction orthogonal to the first path, and in the traveling direction of the mover or the armature, inside the respective armatures.

3. The linear motor according to claim 1, wherein the respective windings disposed on the first magnetic pole tooth and the second magnetic pole tooth are reversed in winding direction from the respective windings disposed on adjacent first magnetic pole teeth and adjacent second magnetic pole teeth, in the traveling direction of the mover or the armature.

4. The linear motor according to claim 1, wherein magnetic fluxes generated by the respective windings disposed on the first magnetic pole tooth and the second magnetic pole tooth are staggered in orientation from magnetic fluxes generated by the respective windings disposed on adjacent first magnetic pole teeth and adjacent second magnetic pole teeth, in the traveling direction of the mover or the armature.

5. The linear motor according to claim 1, wherein an empty space is formed in a part between a lateral face of the magnetic material for linking the first magnetic pole tooth to the second magnetic pole tooth and a lateral face of the magnetic material for linking adjacent first magnetic pole teeth to adjacent second magnetic pole teeth, in the traveling direction of the mover or the armature.

6. The linear motor according to claim 1, wherein the respective windings disposed on the first magnetic pole tooth, and the second magnetic pole tooth are identical to each other in phase, or differ in phase from each other by 180 degrees for every adjacent magnetic pole tooth, in the traveling direction of the mover or the armature.

7. The linear motor according to claim 1, further comprising a plurality of pieces of first magnetic pole teeth and second magnetic pole teeth, lined up in the traveling direction of the mover or the armature, wherein a relationship between a magnet pitch $\tau m$ and a pitch $\tau p$ between the magnetic pole teeth, in the z-direction, is represented by $(3m\pm1)\tau m = 3m\tau p$ (where m=an integer, 2, 3, 4 . . . ).

8. The linear motor according to claim 1, further comprising a plurality of pieces of first magnetic pole teeth and second magnetic pole teeth, lined up in the traveling direction of the mover or the armature, wherein a relationship between a magnet pitch τm and a pitch τp between the magnetic pole teeth, in the z-direction, is represented by n $(3m\pm1)\tau m=3mn\tau p$ (n=1, 2, 3 ..., m=integer, 2, 3, 4 ...).

9. The linear motor according to claim 1, wherein the permanent magnets are vertically disposed in a multitude of tiers, respectively.

10. The linear motor according to claim 1, wherein the permanent magnets are vertically disposed in two stages, respectively.

11. A linear motor drive system comprising the plurality of linear motors according to claim 1, wherein the plural linear motors each are provided with a drive unit.

12. The linear motor according to claim 1, further comprising at least not less than two units of the movers.

13. The linear motor according to claim 12, wherein the plurality of movers are linked with each other.

14. The linear motor according to claim 1, wherein a permanent-magnet holding member with the permanent magnet disposed therein is provided with a side plate.

15. The linear motor according to claim 1, wherein a permanent magnet holding member with the permanent magnet disposed therein is fixed to a side plate.

16. A linear motor comprising:
a mover formed by lining up a plurality of pieces of permanent magnets or magnetic materials side-by-side while inversing a magnetization direction thereof; and
an armature, including:
a first magnetic pole tooth, and a second magnetic pole tooth, disposed in such a way as to vertically tuck the permanent magnet or the magnetic material;
a magnetic material for linking the first magnetic pole tooth to the second magnetic pole tooth, thereby forming a path for a magnetic flux; and
first and second windings disposed on the first magnetic pole tooth and the second magnetic pole tooth, respectively, together with at least two units of the armatures being lined up in the traveling direction of the mover or the armature, to be linked with each other by use of the magnetic material, between the magnetic materials for linking the first magnetic pole tooth to the second magnetic pole tooth, the linear motor producing thrust for causing the mover and the armatures to make a relative horizontal movement, wherein at least two different flux paths for allowing a magnetic flux from each of the windings to pass therethrough are provided.

* * * * *